US012018528B2

(12) United States Patent
Holt et al.

(10) Patent No.: US 12,018,528 B2
(45) Date of Patent: Jun. 25, 2024

(54) ARCHITECTURAL COVERING ASSEMBLY WITH AN END CAP HAVING A PRINTED CIRCUIT BOARD AND AN ACTUATION MEMBER

(71) Applicant: Hunter Douglas Inc., Pearl River, NY (US)

(72) Inventors: Ronald Holt, Westminister, CO (US); Stephen T. Wisecup, Niwot, CO (US)

(73) Assignee: Hunter Douglas Inc., Pearl River, NY (US)

( * ) Notice: Subject to any disclaimer, the term of this patent is extended or adjusted under 35 U.S.C. 154(b) by 0 days.

(21) Appl. No.: 18/299,426

(22) Filed: Apr. 12, 2023

(65) Prior Publication Data

US 2023/0243213 A1 Aug. 3, 2023

Related U.S. Application Data

(60) Continuation of application No. 17/489,201, filed on Sep. 29, 2021, now Pat. No. 11,655,674, which is a division of application No. 16/714,094, filed on Dec. 13, 2019, now Pat. No. 11,136,819, which is a
(Continued)

(51) Int. Cl.

| | |
|---|---|
| ***E06B 9/72*** | (2006.01) |
| ***E06B 9/174*** | (2006.01) |
| ***E06B 9/262*** | (2006.01) |
| ***E06B 9/50*** | (2006.01) |
| ***E06B 9/68*** | (2006.01) |
| ***H01H 15/00*** | (2006.01) |

(52) U.S. Cl.
CPC ................ *E06B 9/72* (2013.01); *E06B 9/174* (2013.01); *E06B 9/262* (2013.01); *E06B 9/50* (2013.01); *E06B 9/68* (2013.01); *H01H 15/005* (2013.01); *E06B 2009/2627* (2013.01); *H01H 2221/014* (2013.01)

(58) Field of Classification Search
CPC ...... E06B 9/72; E06B 9/68; E06B 2009/2627; E06B 9/174; E06B 9/262; E06B 9/50; H01H 15/005; H01H 2221/014
See application file for complete search history.

(56) References Cited

U.S. PATENT DOCUMENTS

| | | | |
|---|---|---|---|
| 1,039,670 | A | 9/1912 | Gagnon |
| 2,544,343 | A | 3/1951 | Miller |
| 2,810,056 | A | 10/1957 | Aldous |

(Continued)

FOREIGN PATENT DOCUMENTS

| | | |
|---|---|---|
| DE | 29804060 | 7/1998 |
| EP | 1154528 | 11/2001 |
| GB | 2072959 | 10/1981 |

*Primary Examiner* — Robert Canfield
(74) *Attorney, Agent, or Firm* — Kilpatrick Townsend & Stockton LLP

(57) ABSTRACT

A static mitigation end cap, for an architectural covering is provided the covering may include a head rail having an end cap. The end cap may include housing extending along a longitudinal length of the head rail and defining a chamber, The end cap may include a printed circuit board received within the chamber arid configured to control a motor assembly operatively connected to the at least one end cap. The end cap may include an actuation member slidably coupled with the end cap for selective engagement with the printed circuit board.

20 Claims, 16 Drawing Sheets

Related U.S. Application Data continuation of application No. 15/193,810, filed on Jun. 27, 2016, now Pat. No. 10,519,713.

(60) Provisional application No. 62/187,794, filed on Jul. 1, 2015.

(56) References Cited

U.S. PATENT DOCUMENTS

| | | | | |
|---|---|---|---|---|
| 3,787,742 | A * | 1/1974 | Murphy | B26B 15/00 200/332.2 |
| 3,809,798 | A | 5/1974 | Simon | |
| 4,152,565 | A * | 5/1979 | Rose | H01H 15/005 200/16 D |
| 4,224,465 | A | 9/1980 | Ruzic | |
| 4,457,720 | A | 7/1984 | Spong | |
| 4,475,020 | A * | 10/1984 | Takai | H01H 3/166 200/16 R |
| 4,648,680 | A | 3/1987 | Gamarra | |
| 4,737,602 | A | 4/1988 | Yamamoto | |
| 4,758,824 | A | 7/1988 | Young | |
| 4,815,837 | A | 3/1989 | Kikuchi et al. | |
| 4,886,946 | A * | 12/1989 | Franks, Jr. | H01H 15/10 200/547 |
| 5,380,967 | A * | 1/1995 | Steen | H01H 23/141 200/329 |
| 5,398,532 | A * | 3/1995 | Janssen | B60R 25/021 439/456 |
| 5,587,886 | A * | 12/1996 | Lan | H01H 1/403 439/246 |
| 6,474,393 | B1 | 11/2002 | Welfonder | |
| 6,497,267 | B1 | 12/2002 | Azar | |
| 6,575,411 | B1 * | 6/2003 | Serizawa | H05K 1/028 174/117 F |
| 6,723,923 | B2 | 4/2004 | Tsukamoto | |
| 7,005,575 | B2 * | 2/2006 | Hedstrom | H04Q 1/20 174/72 A |
| 7,297,871 | B2 * | 11/2007 | Watanabe | B60R 16/0215 174/72 A |
| 7,507,925 | B2 * | 3/2009 | Rudolf | H01H 9/06 200/332.2 |
| 7,527,534 | B1 * | 5/2009 | Cheng | H02G 11/02 439/770 |
| 7,587,795 | B2 | 9/2009 | Yamamoto | |
| 7,723,939 | B2 | 5/2010 | Carmen, Jr. | |
| 7,916,459 | B2 | 3/2011 | Lee | |
| 8,035,049 | B2 * | 10/2011 | Kato | G01D 5/2451 200/329 |
| 8,258,993 | B2 | 9/2012 | Inoue et al. | |
| 8,723,454 | B2 | 5/2014 | Skinner et al. | |
| 9,334,688 | B2 * | 5/2016 | Colson | E06B 9/42 |
| 10,519,713 | B2 | 12/2019 | Holt et al. | |
| 10,676,989 | B2 * | 6/2020 | Buccola, Jr. | E06B 9/34 |
| 10,727,020 | B1 * | 7/2020 | Tseng | H01H 15/005 |
| 10,731,411 | B2 * | 8/2020 | Holt | E06B 9/72 |
| 11,299,932 | B2 * | 4/2022 | Foley | E04F 10/0685 |
| 11,316,370 | B2 * | 4/2022 | Poirier | H02J 50/10 |
| 11,486,198 | B2 * | 11/2022 | Anthony | E06B 9/72 |
| 2002/0027184 | A1 | 3/2002 | Kovach | |
| 2004/0129849 | A1 | 7/2004 | Walker et al. | |
| 2004/0134628 | A1 * | 7/2004 | Judkins | E06B 9/323 248/266 |
| 2004/0154757 | A1 | 8/2004 | Osinga | |
| 2005/0092512 | A1 * | 5/2005 | Kogure | H02G 11/00 174/72 A |
| 2006/0250203 | A1 * | 11/2006 | Marmaropoulos | H01H 36/00 335/205 |
| 2008/0210828 | A1 * | 9/2008 | Kogure | B60R 16/0215 248/65 |
| 2010/0175838 | A1 | 7/2010 | Faller | |
| 2011/0042193 | A1 | 2/2011 | Wei | |
| 2011/0139381 | A1 | 6/2011 | Daniels | |
| 2011/0247924 | A1 | 10/2011 | Cao | |
| 2011/0253320 | A1 | 10/2011 | Baugh | |
| 2012/0031567 | A1 | 2/2012 | Shier | |
| 2012/0186959 | A1 | 7/2012 | Chen | |
| 2012/0241295 | A1 | 9/2012 | Huang | |
| 2012/0261078 | A1 | 10/2012 | Adams | |
| 2013/0140161 | A1 | 6/2013 | Gao | |
| 2013/0199735 | A1 | 8/2013 | Colson | |
| 2013/0269887 | A1 | 10/2013 | Skinner et al. | |
| 2013/0313376 | A1 | 11/2013 | Shirey et al. | |
| 2014/0021307 | A1 | 1/2014 | McLauchlan | |
| 2015/0034258 | A1 | 2/2015 | Bohlen | |
| 2015/0034259 | A1 | 2/2015 | Bohlen | |
| 2015/0047795 | A1 | 2/2015 | Bohlen et al. | |
| 2015/0054608 | A1 * | 2/2015 | Sun | H01H 15/18 335/207 |
| 2015/0075732 | A1 | 3/2015 | Kirby | |
| 2016/0111233 | A1 | 4/2016 | Teoh | |
| 2016/0123076 | A1 | 5/2016 | Kirby | |
| 2016/0284494 | A1 * | 9/2016 | Liu | H01H 1/36 |
| 2017/0167193 | A1 | 6/2017 | Slivka | |
| 2017/0241201 | A1 | 8/2017 | Buccola | |
| 2018/0106102 | A1 | 4/2018 | Holt et al. | |
| 2018/0106105 | A1 * | 4/2018 | Anthony | H01H 5/00 |
| 2020/0165866 | A1 * | 5/2020 | Holt | E06B 9/72 |
| 2020/0185965 | A1 | 6/2020 | Poirier et al. | |
| 2023/0151690 | A1 * | 5/2023 | Menendez | E06B 9/42 318/255 |

* cited by examiner

ARCHITECTURAL COVERING ASSEMBLY WITH AN END CAP HAVING A PRINTED CIRCUIT BOARD AND AN ACTUATION MEMBER

CROSS-REFERENCES TO RELATED APPLICATIONS

This patent application is a continuation of U.S. application Ser. No. 17/489,201, filed Sep. 29, 2021, which is a divisional of U.S. application Ser. No. 16/714,094, filed Dec. 13, 2019, now U.S. Pat. No. 11,136,819, which is a continuation of U.S. application Ser. No. 15/193,810, filed Jun. 27, 2016, now U.S. Pat. No. 10,519,713, which claims priority under 35 U.S.C. § 119(e) to U.S. Provisional Application No. 62/187,794, filed Jul. 1, 2015, each of which are hereby incorporated by reference in their entireties.

TECHNICAL FIELD

The present disclosure relates generally to coverings for architectural openings, and more particularly to a head rail end cap for shielding motor control components from electrostatic discharge.

BACKGROUND

Motor-driven coverings for architectural openings (such as windows, doors, archways, and the like) cause the generation of static electricity by the extension and retraction of the covering. Static electricity may be generated, for example, during the extension and/or retraction of a shade component, such as a sheet of material, a lift cord, or an operating cord, into and out of a head rail. Static energy may also be transmitted to the motor-driven covering through a user's fingers after the user walks across the floor and touches the covering, such as to actuate a switch for the motor drive. The static electricity may be harmful to the electrical components of the motor drive if it discharges through sensitive electrical control components, such as a printed circuit board. Reducing static electricity buildup within the covering, as well as insulating control components from potential electrostatic sources, reduces the likelihood of this adverse effect.

SUMMARY

The present disclosure generally provides a static mitigation head rail end cap for a covering for an architectural opening. In a preferred embodiment, the static mitigation end cap is configured to reduce the likelihood of electrostatic discharge through sensitive electronic control components used in a motor-driven covering. As provided below, the end cap isolates a motor control component, such as a printed circuit board, from discharge of static electricity generated during operation of a motor-driven covering or by transfer of static energy from contact with a user. A further understanding of the nature and advantages of the present disclosure may be realized by reference to the remaining portions of the specification and the drawings.

The present disclosure is given to aid understanding, and one of skill in the art will understand that each of the various aspects and features of the disclosure may advantageously be used separately in some instances, or in combination with other aspects and features of the disclosure in other instances. Accordingly, while the disclosure is presented in terms of examples, it should be appreciated that individual aspects of any example can be claimed separately or in combination with aspects and features of that example or any other example.

The present disclosure is set forth in various levels of detail in this application and no limitation as to the scope of the claimed subject matter is intended by either the inclusion or non-inclusion of elements, components, or the like in this summary. In certain instances, details that are not necessary for an understanding of the disclosure or that. render other details difficult to perceive may have been omitted, it should be understood that the claimed subject matter is not necessarily limited to the particular examples or arrangements illustrated herein.

BRIEF DESCRIPTION OF THE DRAWINGS

The accompanying drawings, which are incorporated into and constitute a part of the specification, illustrate examples of the disclosure and, together with the general description given above and the detailed description given below, serve to explain the principles of these examples.

DETAILED DESCRIPTION

Figure 1:
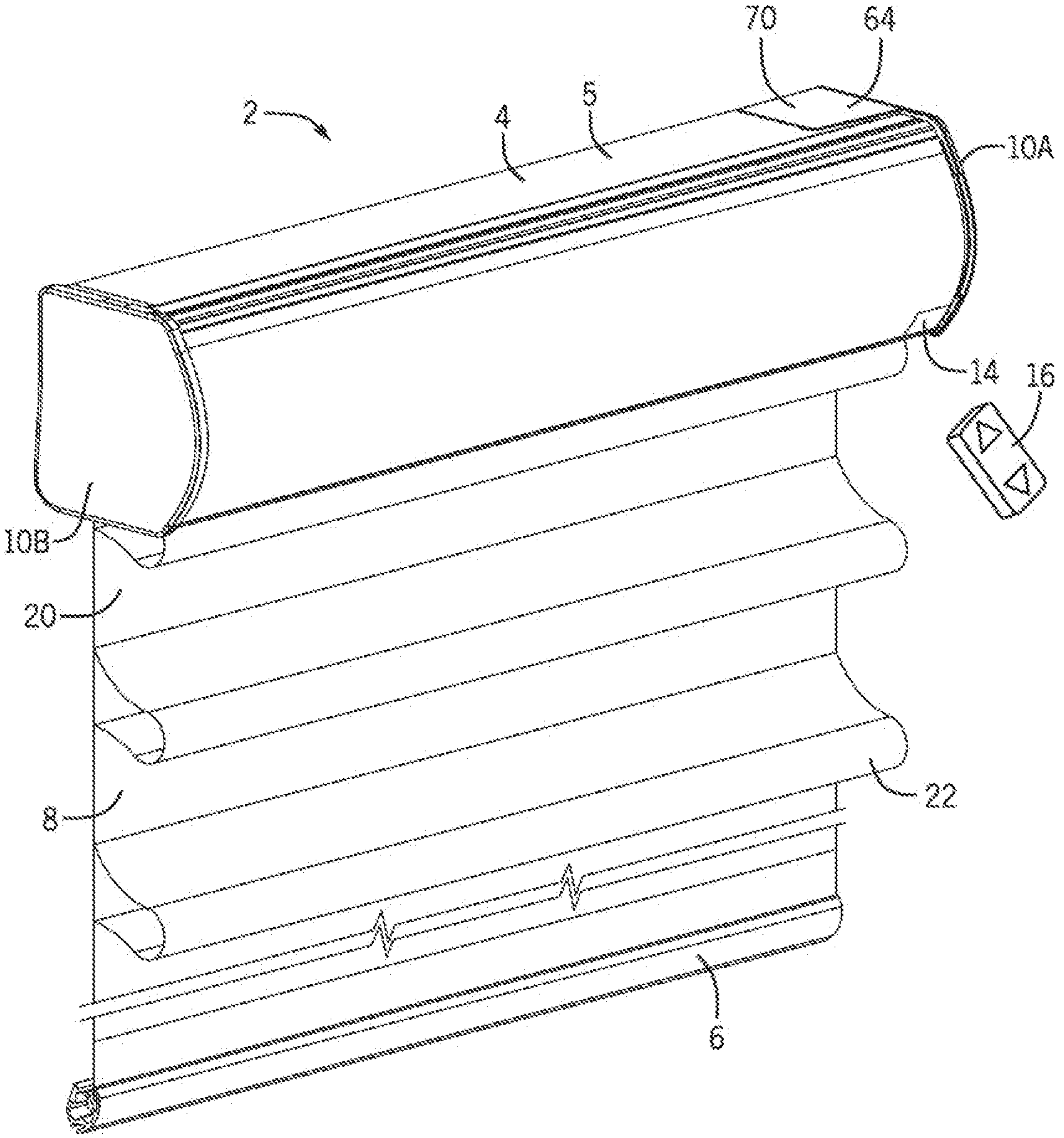
FIG. 1 is a fragmentary isometric view of a motor-driven retractable covering incorporating a static mitigation end cap in accordance with some embodiments of the present disclosure.
Figure 18:
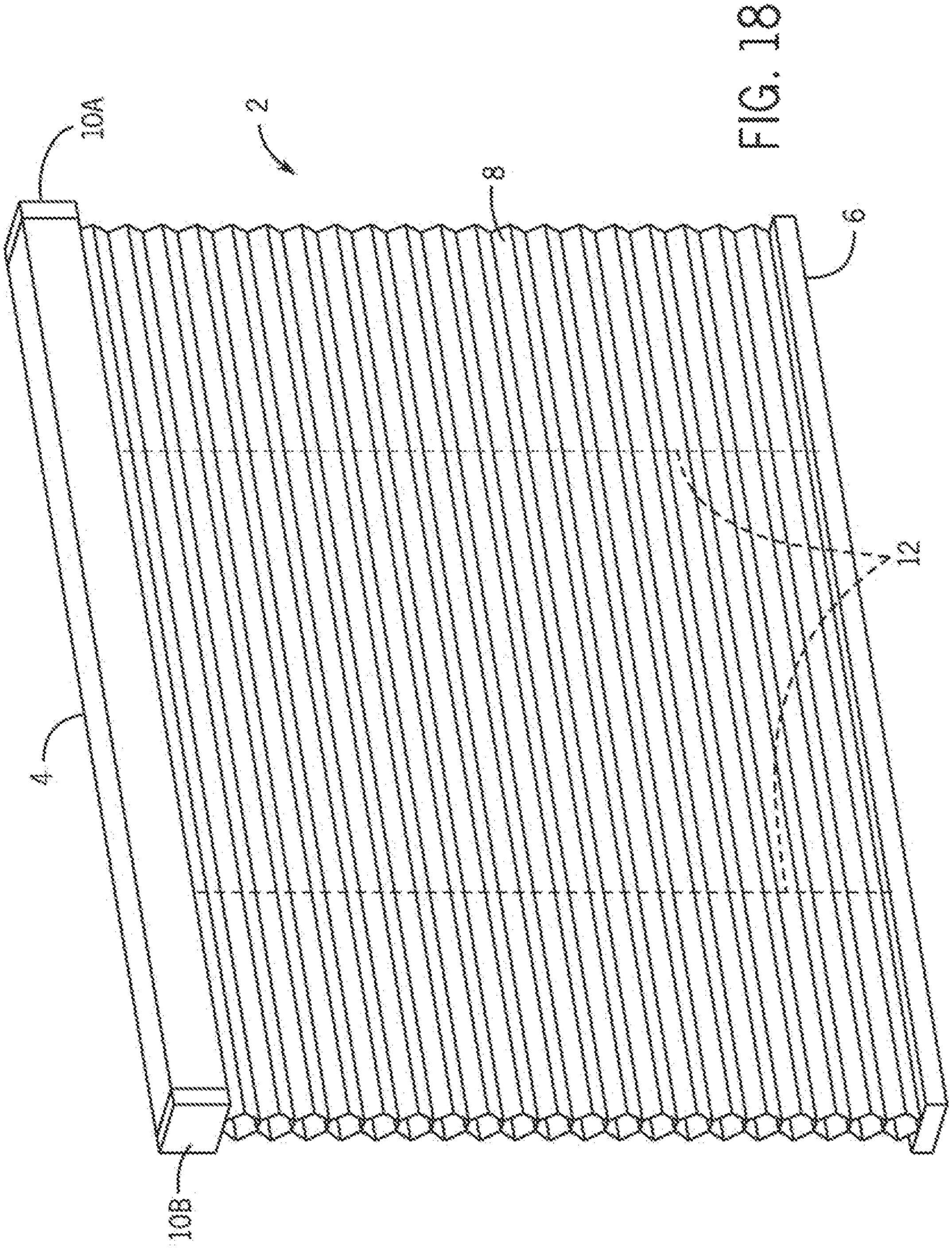
FIG. 18 is an isometric view of a stackable retractable covering incorporating a static mitigation end cap in an extended position in accordance with some embodiments of the present disclosure.
Figure 19:
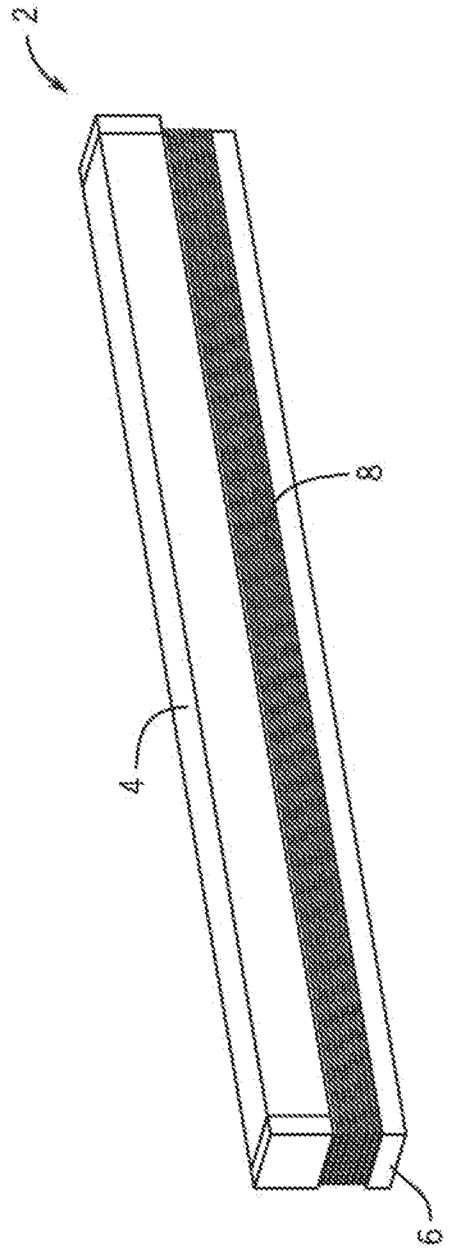
FIG. 19 is an isometric view of the stackable retractable covering of FIG. 18 in a retracted position in accordance with some embodiments of the present disclosure.

Referring to FIG. 1, a motorized covering 2 for an architectural opening is provided with an end cap 10A configured for use in an environment in which it is desirable to mitigate or reduce static electricity. The covering 2 may include a head rail 4, a bottom rail 6, and a shade 8, and may be mounted adjacent to one or more sides of an architectural opening. The head rail 4 may include two opposing end caps 10A and 10B, which may enclose the open ends of the head rail 4. A roller tube (not shown) may extend substantially the entire distance between the two opposing end caps 10A and 106 and may be rotatably supported within the head rail 4 by the two opposing end caps 10. The shade 8 may be attached to the roller tube by adhesive, corresponding retention features, or any other suitable attachment means, and may depend from the roller tube to extend in a substantially vertical plane between the roller tube and the bottom rail 6. The bottom rail 6 may be an elongated member attached to a lower edge of the shade 8. Although the description below refers to a shade wrapped about a roller tube, it is contemplated that the shade 8 may be retractable to the head rail 4 in a stacked configuration. For example, as shown in FIGS. 18 and 19, the shade 8 may be configured to stack or fold onto itself in a vertical manner when retracted towards the head rail 4.

Figure 4:
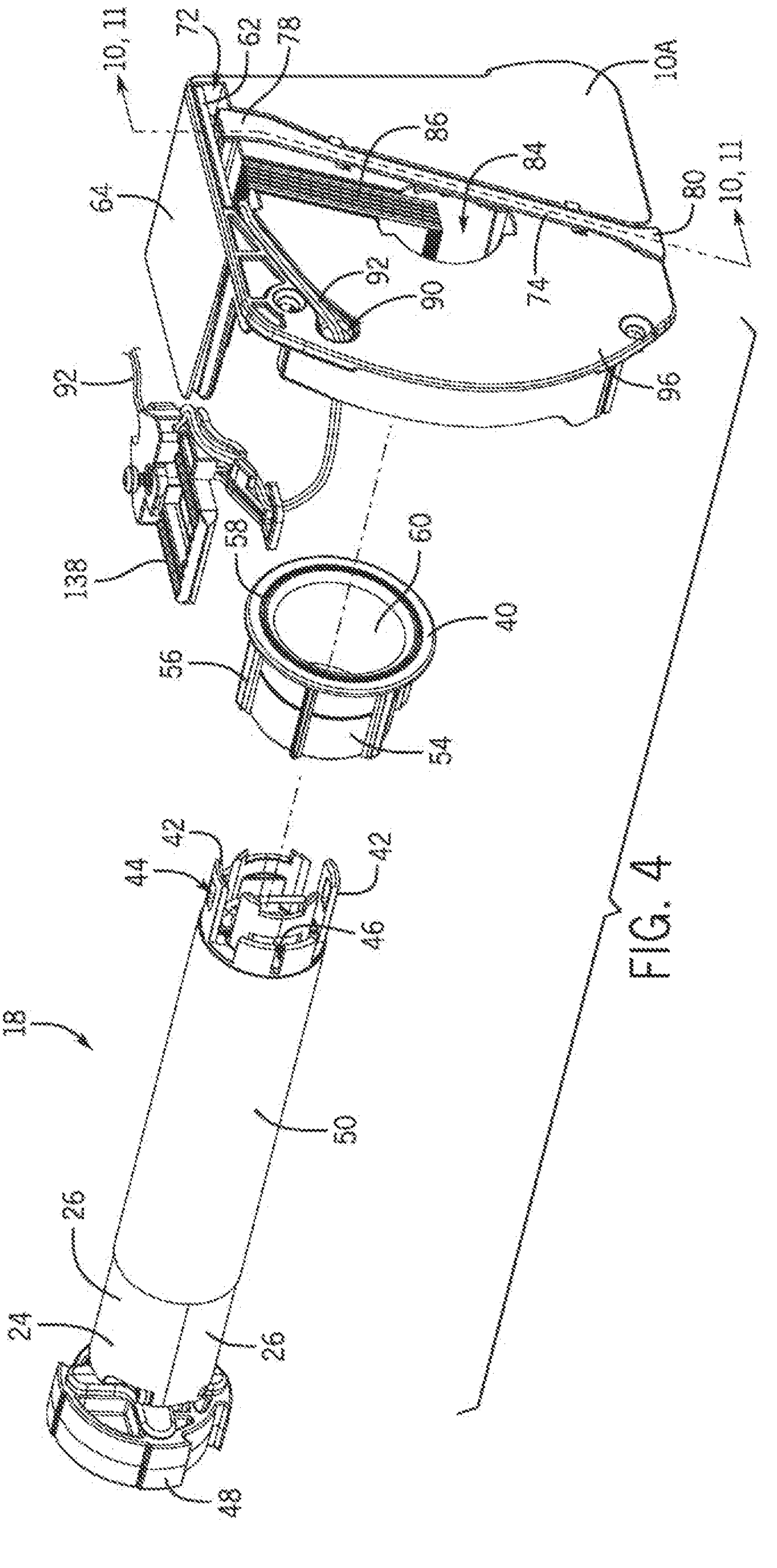
FIG. 4 is an exploded isometric view of the drive assembly components of FIG. 3 in accordance with some embodiments of the present disclosure.
Figure 5:
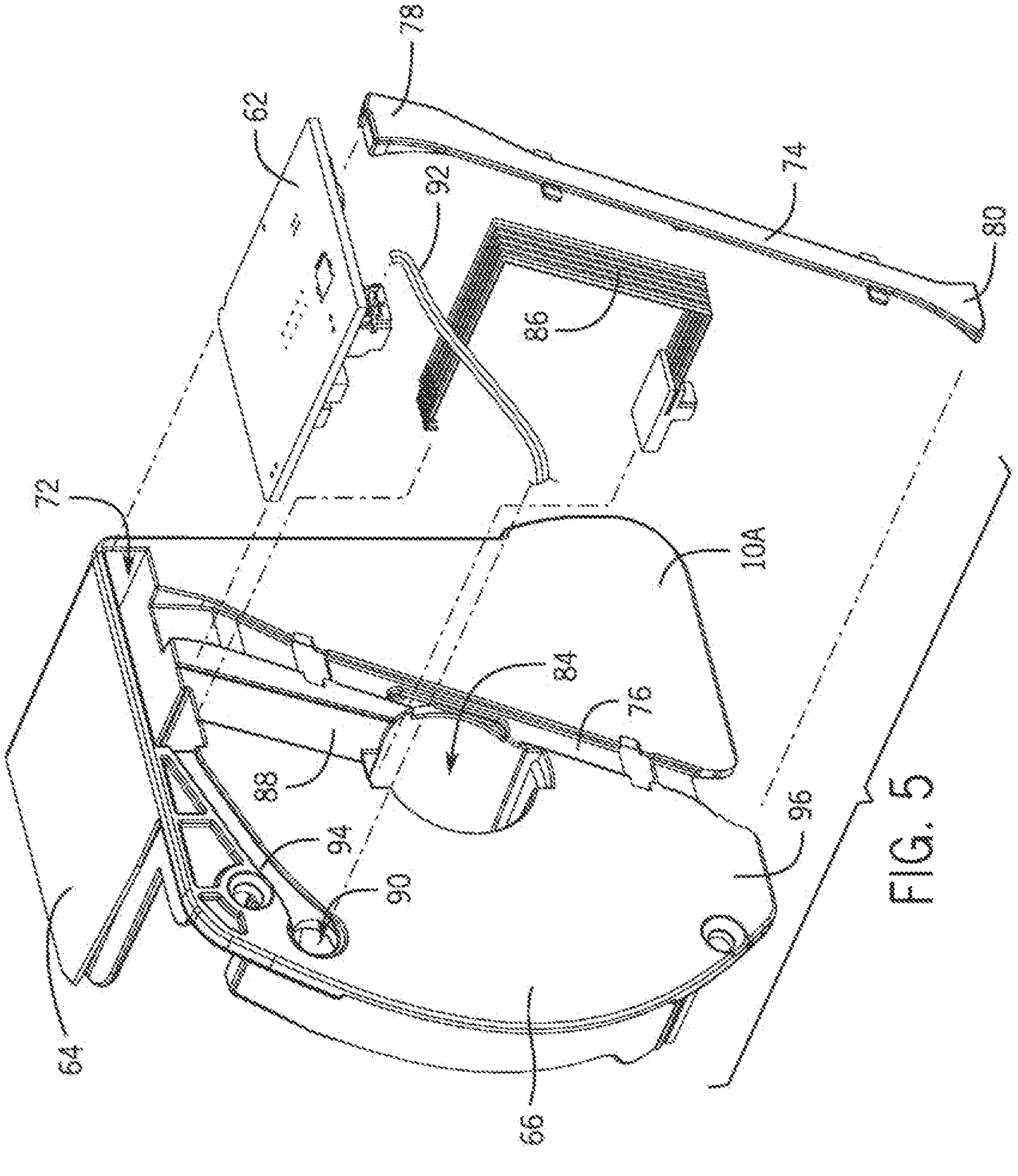
FIG. 5 is an exploded isometric view of static mitigation end cap components in accordance with some embodiments of the present disclosure.

With reference to FIG. 1, the present disclosure generally provides an end cap 10A for a covering 2 for an architectural opening, such as a window, door, archway, or the like. In accordance with one aspect of the invention, the end cap 10A may be a static mitigation end cap that generally isolates electrical components (e.g., a motor control component and/or a printed circuit board 62) from potential sources of static energy such as that generated during operation of a motor driven covering or from the transfer of static energy by contact with a user. The end cap 10A includes a housing 64, which defines a chamber 72 to receive the printed circuit board 62, and to facilitate the electrical connection from the printed circuit board 62 to the motor drive components to control a motor assembly 18 for extending and retracting the covering 2 across the architectural opening (see FIG. 1). The motor assembly 18 may be received within a roller tube rotatably supported within a head rail 4 by the end cap 10A and may drive the roller tube to extend and retract a shade 8 attached to the roller tube (see FIG. 1). It will be appreciated that other locations and configurations of the motor assembly 18 are within the scope of the present disclosure. With reference to FIG. 5, an actuation member 74 for controlling the functions of the printed circuit board 62 is slidably coupled to the end cap 10. In some embodiments, a portion of the actuation member 74 is received within a channel 76 formed in the end cap 10A such that at least a portion (e.g., an outer surface portion) of the actuation member 74 is substantially flush with an outer face 66 of the end cap 10A to minimize any light gaps between the end cap 10A and the architecture opening. As illustrated in FIG. 4, for example, a power cable assembly 92 is operatively connected to the printed circuit board 62 to provide power to the motor assembly 18. A cable restraint bracket 138 may be provided to position the power cable assembly 92 within the head rail 4 and help prevent the power cable assembly 92 from interfering with rotation of the roller tube, and may prevent the power cable assembly 92 from being disconnected from the printed circuit board 62, as explained below.

Figure 3:
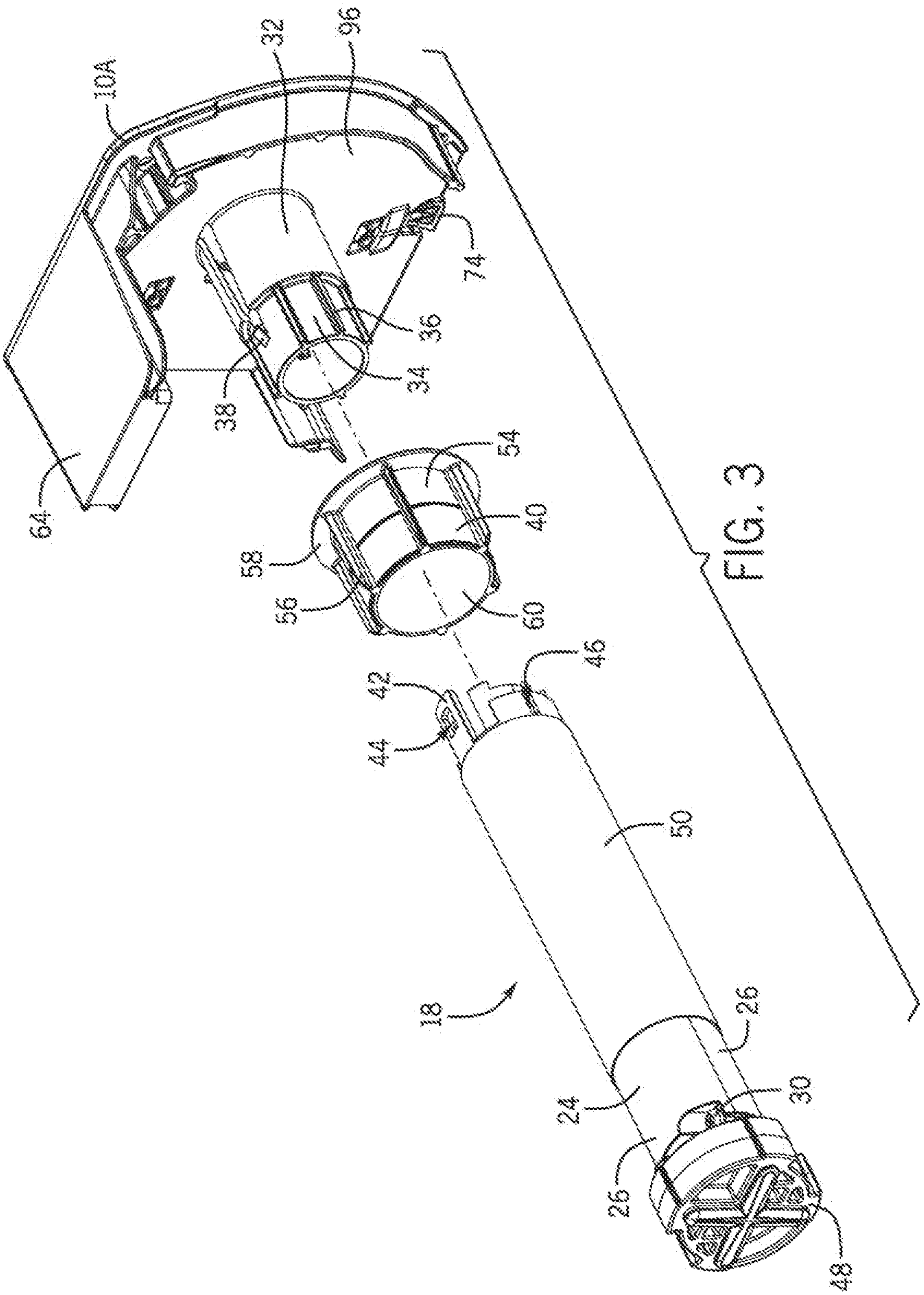
FIG. 3 is an exploded isometric view of drive assembly components of a covering in accordance with some embodiments of the present disclosure.

With reference to FIGS. 3-5, at least one of the opposing end caps 10, such as a right end cap 10A (as viewed in these figures), is configured to isolate a printed circuit board 62 from electrostatic discharge, In some embodiments, the end cap 10A may only mitigate or reduce the effects of static electricity buildup and/or discharge on the printed circuit. board 62. As shown in FIG. 5, the end cap 10A may include a housing or enclosure 64 configured to receive the printed circuit board 62 therein. In an embodiment in which it is desirable to mitigate or reduce the effects of static electricity buildup and/or discharge, the housing 64 is formed of an insulating material to isolate the printed circuit board 62 from static electricity discharge while simultaneously allowing full functional use of the printed circuit board 62 to control movement of the shade 8. As shown in FIGS. 3 and 5, the housing 64 extends along a longitudinal length of the head rail 4 inwardly a distance from the right end cap 10A towards the left end cap 108. Although the figures and their associated description describe the right end cap 10A, the left end cap 108 may be similarly configured.

Figure 6:
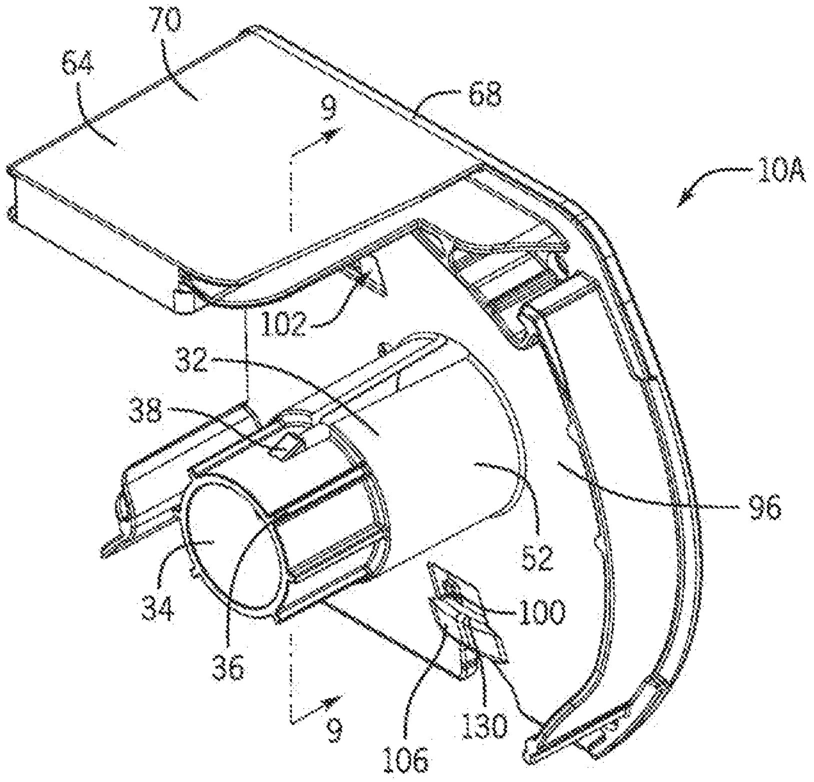
FIG. 6 is a top front isometric view of a static mitigation end cap in accordance with some embodiments of the present disclosure.
Figure 9:
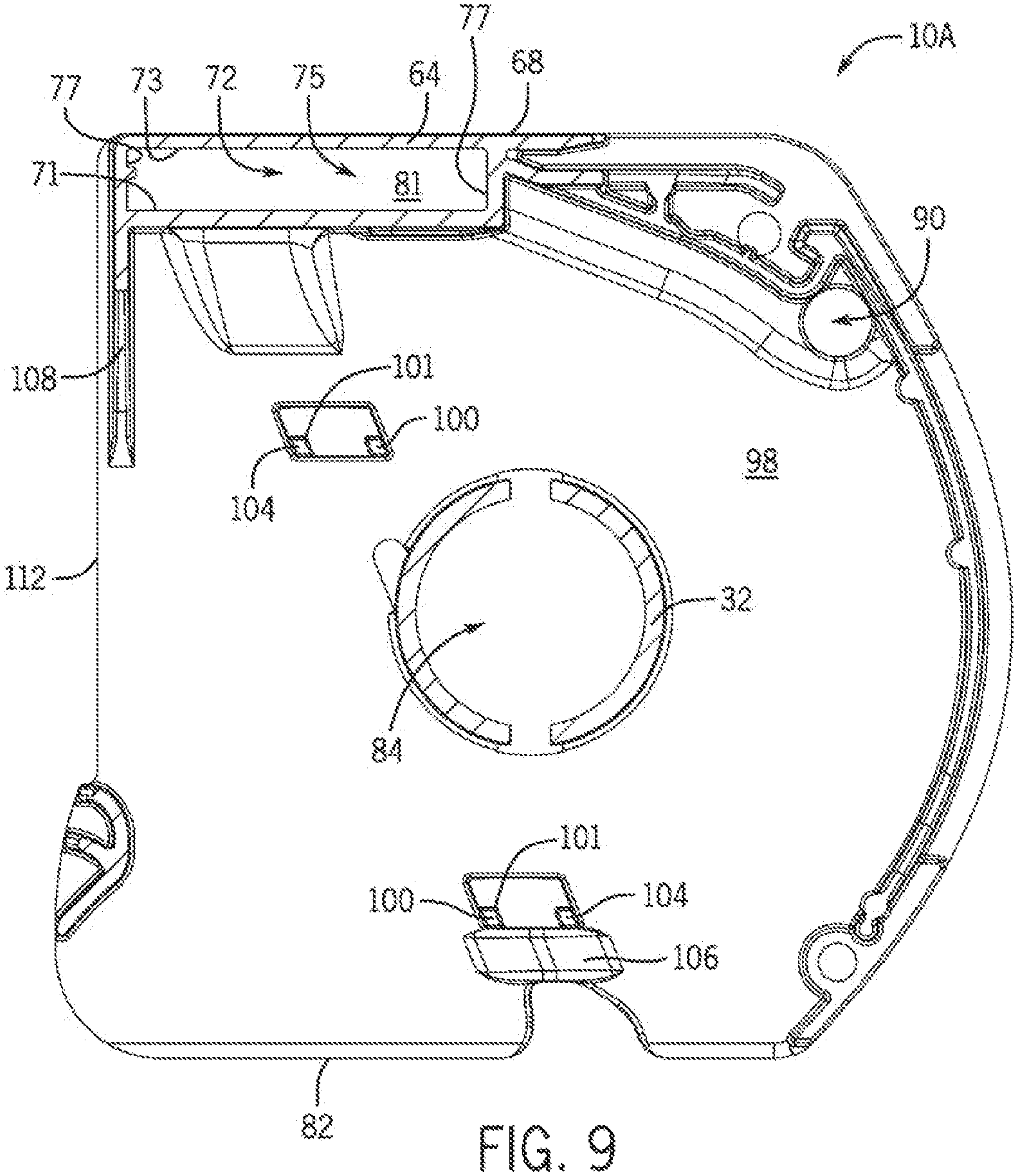
FIG. 9 is a transverse cross-sectional view of a static mitigation end cap taken along line 9.9 of FIG. 6 in accordance with some embodiments of the present disclosure.

With reference to FIG. 6, the housing 64 may be positioned separate from the major plane of the end cap 10A (which is substantially perpendicular to the axis of rotation of covering 2). For example, the housing 64 may extend transversely (e.g., at right. angles) away from a. top rim 68 of the end cap 10A. This location of the housing 64 allows the reduction in thickness dimension of a sidewall 96 of the end cap 10A because the end cap 10A no longer needs to accommodate the housing 64 on its sidewall 96. An end cap 10A having a sidewall 96 with a reduced thickness may have several benefits, including, without limitation, reduction in raw materials, and less thickness to allow reduction of any light gaps between the side edge of the covering 2 and an architectural opening or an adjacent-mounted head rail 4. In some embodiments, the housing 64. may be integrally formed with the top rim 68 of the end cap 10A, and when connected to the headrail 4, the top surface 70 of the housing 64 may be flush with and form a portion of the top face 5 of the head rail 4 (see FIG. 1). Referring to FIG. 9, for example, the housing 64 may be substantially cuboid in shape and define an interior chamber 72 bounded substantially on five sides by the housing walls, and having a width, a height, and a length. For example, the chamber 72 may be open at one end, and may be defined by a bottom wall 71, a top wail 73, opposing sidewalls 77, and an end wall 81. In some embodiments, the width of the chamber 72 may be greater than its height, and the length of the chamber 72 may be greater than its height. in some embodiments, the housing 6$ extends inward a distance greater than the length of the mounting boss 32. In some embodiments, the housing 64 extends at. substantially a right angle relative to an outer face 66 of the end cap 10A (see FIG. 5). In some embodiments, the housing 64 is transversely spaced from the motor assembly 18 and extends in an axial direction along a length of the roller tube. The housing 64 may be transversely spaced from the outer surface of the roller tube a sufficient distance so as to not interfere with wrapping of the shade 8 about the roller tube, for example.

Figure 20:
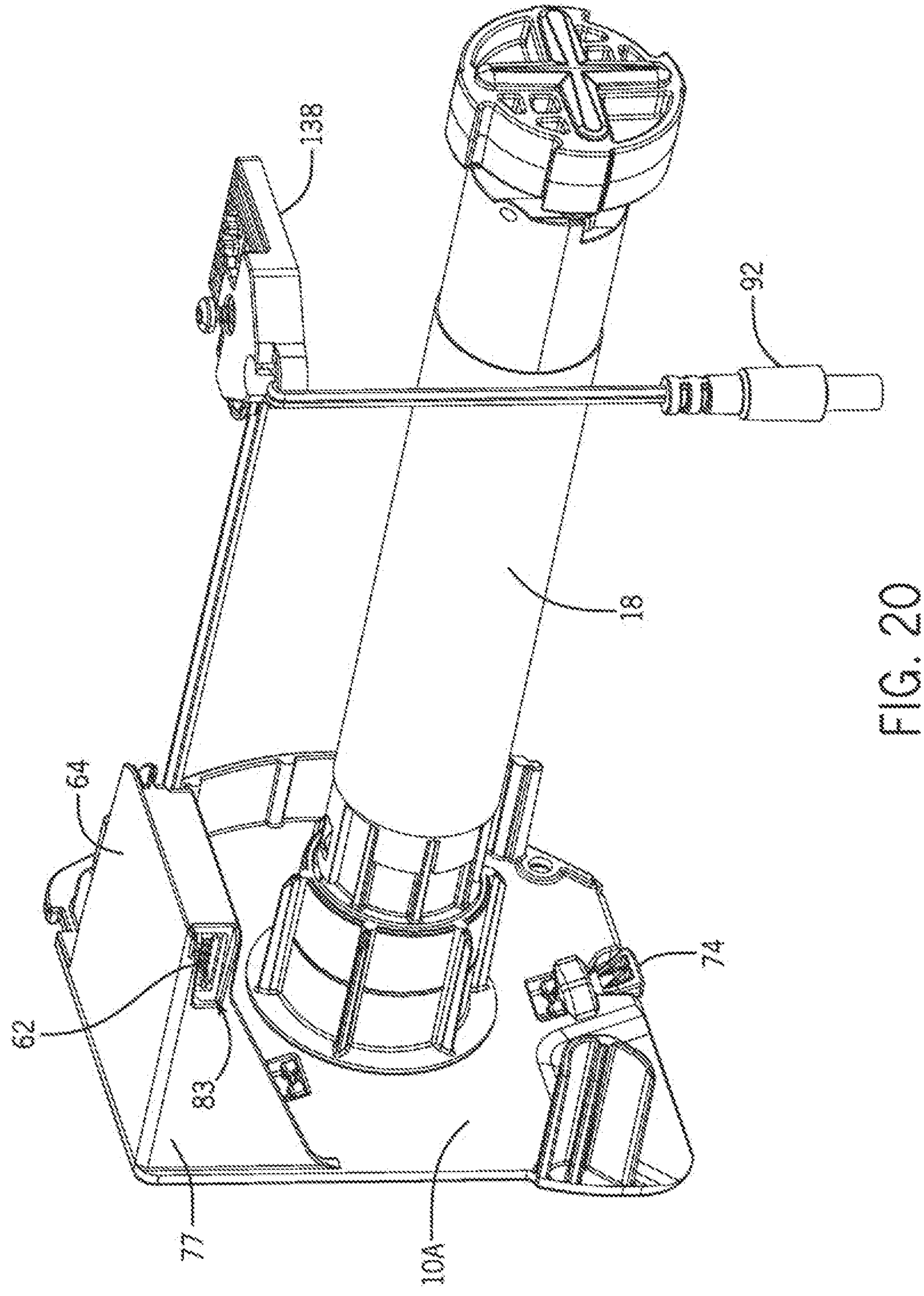
FIG. 20 is a rear isometric view of a static mitigation end cap with a motor assembly mounted thereto in accordance with some embodiments of the present disclosure.

As shown in FIG. 5, the housing 64 may be open 75 at the miter face 66 to allow the printed circuit board 62 to be slid into the chamber 72 longitudinally along the length of the housing 64 from the outer face 66 towards the roller tube. With reference to FIG. 4, the printed circuit board 62 may be housed sufficiently within the housing 64 such that an end of the printed circuit board 62 sits at least substantially flush with the outer face 66. The printed circuit board 62 may be accessed and removed through the opening 75 of the chamber 72 to repair and/or replace the printed circuit board 62. With reference to FIG. 20, in some embodiments, a port 83 may be defined within one of the wails of the chamber 72 (e.g., within the sidewall 77 positioned towards the rear of the covering 2), the port 83 in communication with the chamber 72. In such embodiments, the printed circuit board 62 may be accessed through the rear port 83 for programming, reprogramming, diagnostic purposes, or the like. In some embodiments, the rear port. 83 may facilitate the use of home automation and/or control of the covering 2. For example, the rear port 83 may permit a home automation system to communicate with the printed circuit board 62, either through a hardwired connection or through Wi-Fi enabled mechanisms. In some embodiments, the position of the port 83 may permit a user to program and/or reprogram the covering 2 without removal of the covering 2 from its associated architectural opening. Also, instead of the top surface 70 of the housing 64 being flush with and forming a portion of the top face 5 of the head rail 4, the housing 64 may be received entirely within the head rail 4, for example in one illustrative embodiment, to extend along an underside of the top face 5 of the head rail 4.

With reference to FIGS. 4 and 5, the chamber 72 preferably has internal dimensions sufficient to receive the printed circuit board 62 therein. The printed circuit board 62 may be releasably secured within the chamber 72 by mechanical fasteners or corresponding retention features; or may be permanently secured in the chamber 72 by adhesive, heat, or sonic welding, or any other suitable attachment means. In some embodiments, the printed circuit board 62 and the chamber 72 may be sized such that the printed circuit board 62 engages the chamber 72 with an interference fit, such as through corresponding tapered widths of the chamber 72 and the printed circuit board 62, respectively, so that the edges of the printed circuit board 62 can frictionally engage the sidewalls 77 of the chamber 72, The printed circuit board 62 may be positioned adjacent the bottom wail 71 of the chamber 72 with the printed circuit board 62 facing upwardly, or the printed circuit board 62 may be positioned adjacent the top wall 73 of the chamber 72 with the printed circuit. board 62 facing downwardly. As shown, the printed circuit board 62 is stable within the chamber 72 and is not affected by the extension and/or retraction of the shades 8 (see FIG. 1). For example, static electricity buildup and/or discharge through the printed circuit board 62 may be mitigated or reduced due at least in part to the printed circuit board 62 being enclosed in insulating material to electrically isolate the printed circuit. board 62 from static energy, and being physically isolated from the passing of the shade 8 into and out of the head rail 4 (see FIG. 1). In embodiments with a rear port 83, the printed circuit board 62 may be insulated from static electricity discharge through a sufficient air gap between the port 83 and any static generating component of the covering 2 (see FIG. 20).

Figure 10A:
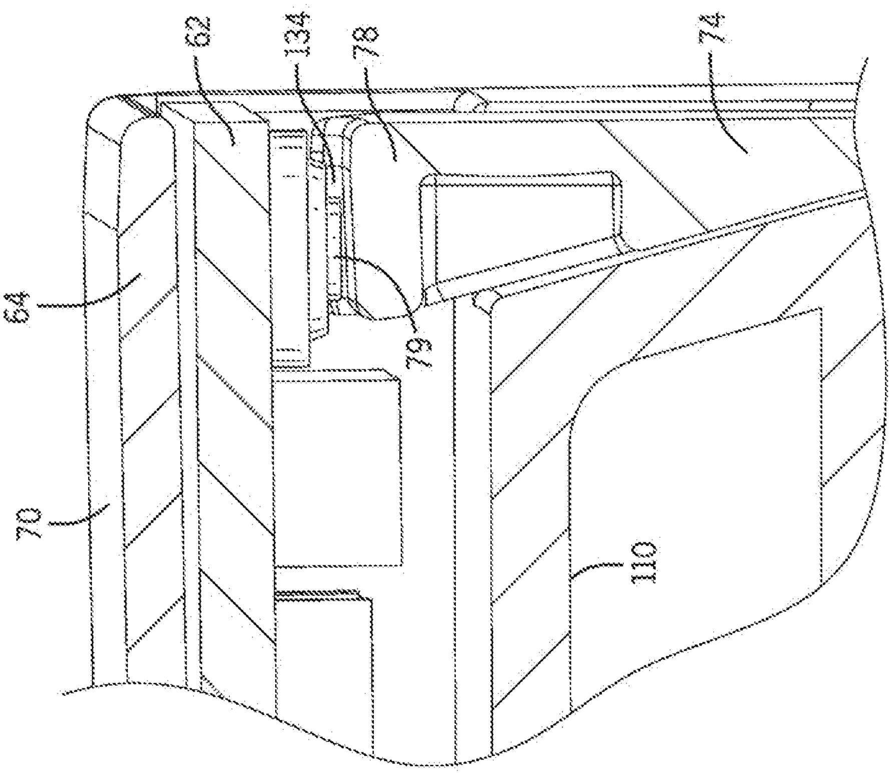
FIG. 10A is an enlarged, fragmentary view of a cross section of the static mitigation end cap components of FIG. 10 taken along detail line 10A-10A of FIG. 10 in accordance with some embodiments of the present disclosure.

As shown in FIG. 4, when received within the chamber 72, the printed circuit board 62 may be in communication with a motor assembly 18 and also may receive input from a user. The end cap 10A may include an actuation member 74 slidably coupled with the end cap 10A for selectively controlling the motor assembly 18 through selective engagement with the printed circuit board 62. For example, as shown in FIG. 5, a portion of the actuation member 74 may be received within a. first channel 76 defined within the outer face 66 of the end cap 10A. During operation, the actuation member 74 may slide within the first channel 76 to selectively engage the printed circuit board 62 to actuate the motor assembly 18. As shown for example in FIGS. 4, 10, and 10A, the actuation member 74 has a length and defines opposing first and second ends 78. 80. In an illustrative embodiment, the first end 78 of the actuation member 74 protrudes into the chamber 72 to engage a switch or button 79 (see FIG. 10A) operatively associated with the printed circuit board 62 to selectively control the covering 2, such as the motor assembly 18, the shade 8, and/or other components of the covering 2. In some embodiments, the first end 78 of the actuation member 74 may be located near the top rim 68 of the end cap 10A, and the second end 80 of the actuation member 74 may protrude away from, be flush with, or be recessed relative to a bottom surface 82 of the end cap 10A (see FIG. 7). In some embodiments, the actuation member 74 may extend upwardly from the second end 80 to the first end 78 along a majority of the height of the end cap 10A. The actuation member 74 may be biased to slide within the first channel 76 away from the printed circuit board 62 due at least in part to the weight of the actuation member 74. in some embodiments, the switch or button 79 may bias the actuation member 74 away from the printed circuit board 62. In some embodiments, the first channel 76 and the actuation member 74 may be sized such that the portion of the actuation member 74 received within the first channel 76 sits substantially flush with the outer face 66 to minimize any light gaps between the outer face 66 and the architectural opening or an adjacent headrail 4.

In some embodiments, portions of the end cap 10A may be adapted to provide feedback to a user during operation of the covering 2. For example, the actuation member 74 may be adapted to function as a light pipe. In such embodiments, the actuation member 74 may be in communication with an LED or other light source positioned on the printed circuit board 62, such as on or adjacent the switch or button 79. The light from the printed circuit board 62 may be visible to a user via the actuation member 74. For instance, light from the LED or other light source may be transmitted from the first end 78 of the actuation member 74 to a viewable position, such as to the second end 80 of the actuation member 74. In this manner, a user may readily determine the operational state of the covering 2 via visual inspection of the actuation member 74. For example, the printed circuit board 62 (through the LED or other light source) may indicate to a user via the actuation member 74 any number of visual cues, such as intermittent or steady-state light, different color, different light intensities, or the like. The different. visual cues may be associated with different operational states of the covering 2, such as extending, retracting, low or inadequate power, or error codes, among others. To facilitate light passing through the actuation member 74, the actuation member 74 may be formed from fiber optic material, such as plastic, glass, or the like, capable of creating light pathways.

Figure 7:
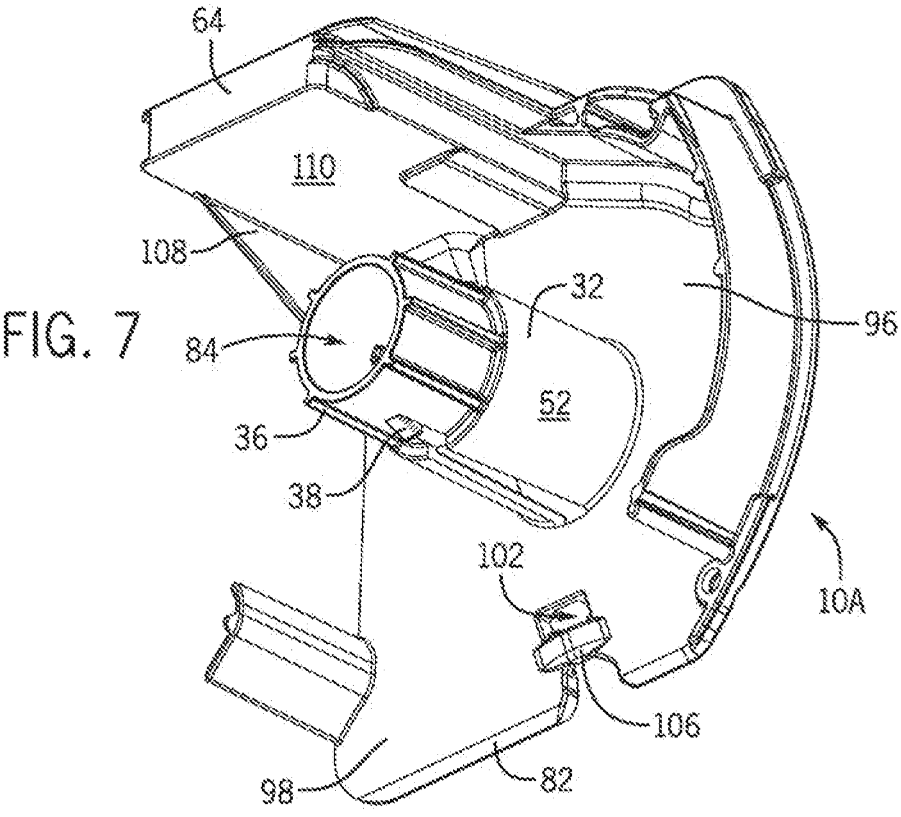
FIG. 7 is a bottom front isometric view of the static mitigation end cap of FIG. 6 in accordance with some embodiments of the present disclosure.

With reference to FIG. 4, the end cap 10A may include an aperture 84 axially aligned with the roller tube to facilitate communication, such as by physical connection, between the printed circuit board 62 and the motor assembly 18 within the roller tube. As shown in FIG. 7, the aperture 84. may be formed within an end of the mounting boss 32, with a control cable 86 in communication with the printed circuit board 62 and the motor assembly 18 at least partially routed through the aperture 84 (see FIGS. 4 and 5). Referring to FIG. 5, the end cap 10A may include a groove 88 defined within₹ the outer lace 66 by opposing sidewalls, and configured to receive at least a portion of the control cable 86. As seen in FIG. 5, in some embodiments, the groove 88 may be as wide as the control cable 86 and may be sized such that the portion of the control cable 86 received within the groove 88 sits substantially flush with the outer face 66 of the end cap 10A. As shown in FIG. 5, the groove 88 has one end open into the aperture 84 and an opposite end open into the chamber 72.

Figure 8:
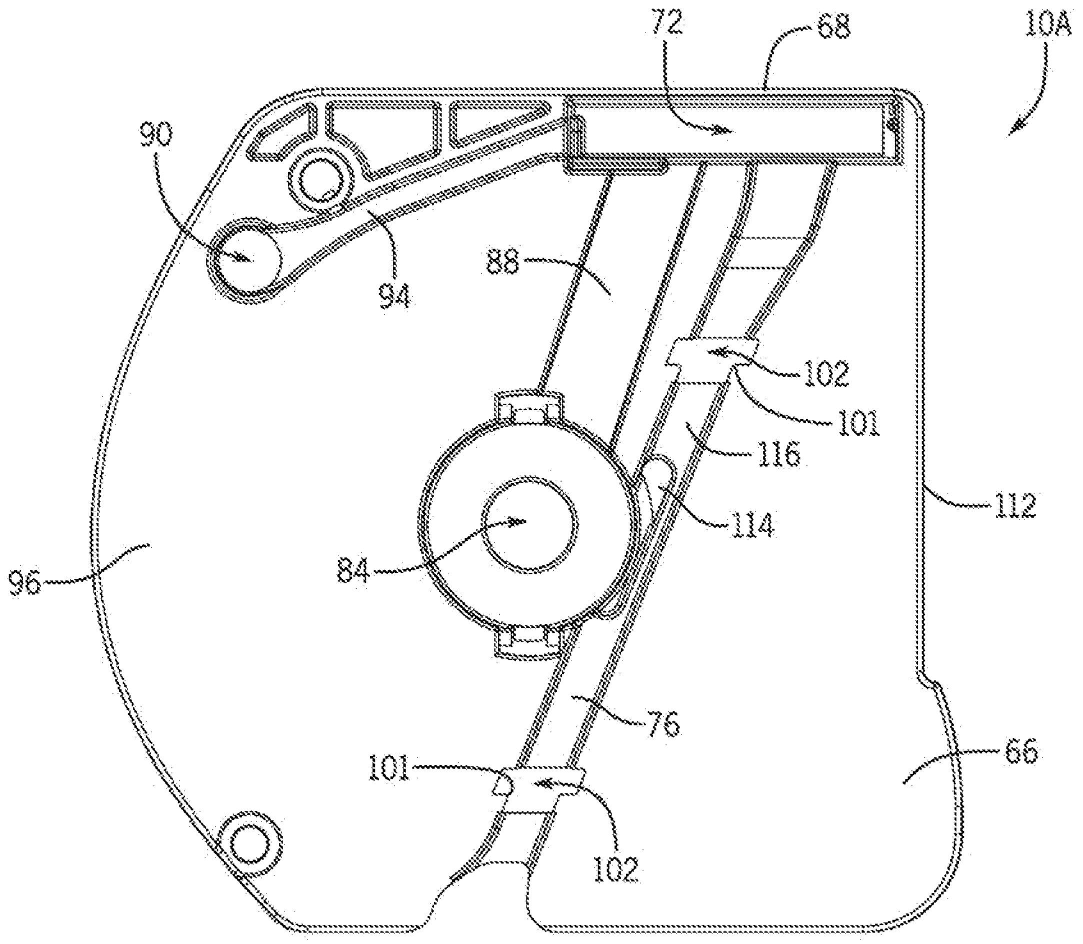
FIG. 8 is a rear elevation view of the static mitigation end cap of FIG. 6 in accordance with some embodiments of the present disclosure.

With reference to FIGS. 5 and 8, the end cap 10A may define an opening 90 with a second channel 94 defined within the outer face 66 and extending from the opening 90 to the chamber 72. As seen in FIG. 5, a portion of a power cable assembly 92 providing power to the motorized covering 2 may be routed through the opening 90 and received within the second channel 9$. The opening 90 may be transversely spaced from the housing 64, such as towards the front of the head rail 4. The power cable assembly 92 may be operatively connected to the printed circuit board 62 to power the printed circuit board 62 and the motor assembly 18 via the control cable 86. In some embodiments, the second channel 94 may be sized so that the portion of the power cable assembly 92 received within the second channel 94 sits substantially flush with the outer face 66 of the end cap 10A. In this manner, when assembled, the portion of the power cable assembly 92 received within the second channel 94, the portion of the control cable 86 received within the groove 88, and the portion of the actuation member 74 received within the first channel 76 may be substantially flush with the outer face 66 to allow flush mounting of the end cap 10A. Flush mounting of the end cap 10A has various benefits, including, without limitation, facilitation of close lateral spacing of the end cap 10A against the architectural opening on which the end cap 10A is mounted to minimize any light gaps between the end cap 10A and the architectural opening.

With continued reference to FIGS. 5 and 8, the outer face 66 of the end cap 10A may be defined by the sidewall 96 of the end cap 10A that is oriented substantially perpendicular to a rotational axis of the covering 2, which may in some examples be defined by a longitudinal axis of the roller tube. The sidewall 96 may be generally planar. As seen in FIG. 7, the mounting boss 32 may be mounted to an inner face 98 of the sidewall 96. The inner face 98 may be generally planar. In another example, the chamber 72 may be positioned on the sidewall 96 of the end cap 10A. Although such embodiments likely would make the sidewall 9$ have a thicker dimension and may inhibit the reduction of light gaps between the covering 2 and the architectural opening, such a sidewall 96 position may nonetheless isolate and/or insulate the printed circuit board 62 from static electricity.

Figure 14:
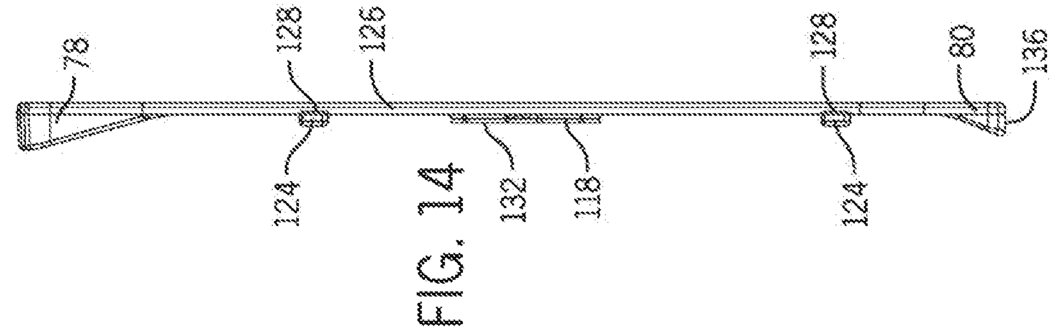
FIG. 14 is a side elevation view of the actuation member of FIG. 12 in accordance with some embodiments of the present disclosure.
Figure 13:
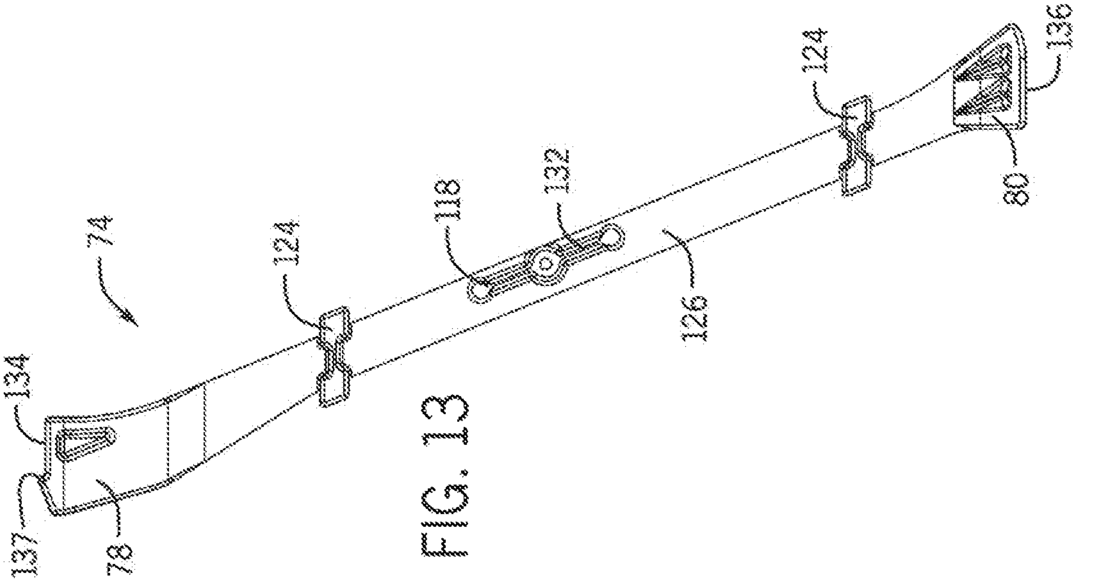
FIG. 13 is a front elevation view of the actuation member of FIG. 12 in accordance with some embodiments of the present disclosure.
Figure 12:
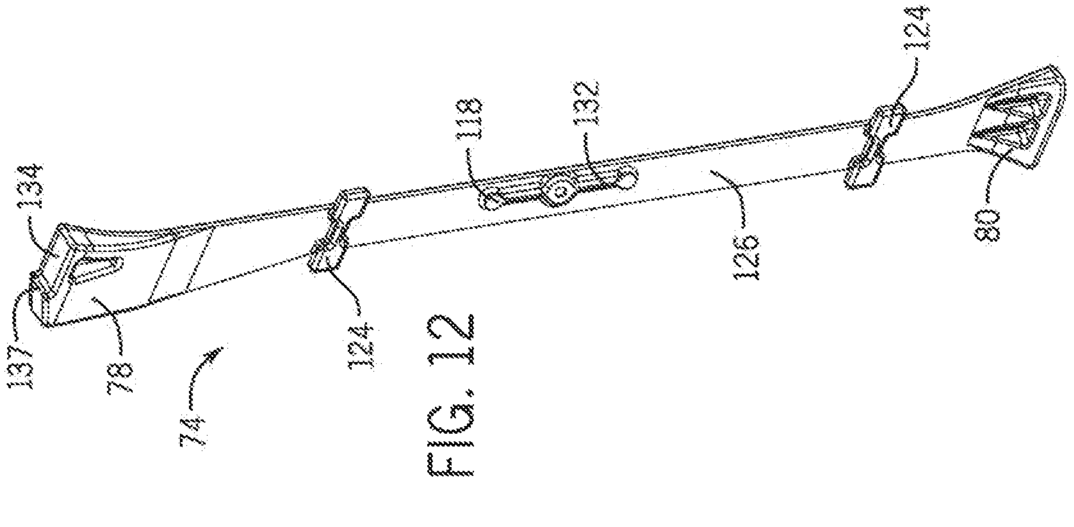
FIG. 12 is an isometric view of an actuation member in accordance with some embodiments of the present disclosure.

With reference to FIG. 8, a plurality of retaining features, such as tabs 101, may be provided by the sidewall 96 (e.g., formed on or attached to) to slidably retain the actuation member 74 within the channel 76 of the end cap 10A. In some embodiments, the tabs 101 may extend into a corresponding plurality of apertures 102 defined within the sidewall 96 and at least partially within the first channel 76. Each tab 101 may be generally planar, may extend substantially parallel to the sidewall 96, and may include an engagement surface 104 facing substantially inward towards the roller tube (see FIG. 9). In some embodiments, the tabs 101 may be formed as a unitary structure with the sidewall 96 and may be substantially flush with the outer face 66. The thickness of the tabs 101 may be less than the thickness of the sidewall 96. In some embodiments, two tabs 101 may be positioned within each of the apertures 102 opposite one another at a bottom portion of the apertures 102. Referring to FIGS. 12-14, the actuation member 74 may include a plurality of corresponding protrusions 124 extending substantially laterally to a main body 126 of the actuation member 74 and configured for sliding engagement. with the plurality of tabs 101. As shown in FIG. 14, each of the protrusions 124 may be generally planar and extend substantially parallel to the main body 126 of the actuation member 74. In some embodiments, the protrusions 124 may be integrally formed with the actuation member 74 and have an engagement surface 128 facing substantially outwardly away from the roller tube. When the actuation member 74 is slidably connected with the end cap 10A, the protrusions 124 may be positioned within each of the apertures 102 such that the engagement surface 128 of each of the protrusions 124 slidably engages the engagement surface 104 of each tab 101. In some embodiments, a pair of protrusions 124 extending laterally opposite from one another may be positioned within each of the apertures 102.

In some embodiments, the end cap 10A and the actuation member 74 may include strengthening features to reinforce each respective component, As shown in FIGS. 6, 7, and 9. portions of the sidewall 96 adjacent the apertures 102 may be thicker in cross-section compared to a nominal thickness of the sidewall 96 to increase the strength of the sidewall 96 in such portions. For example, the end cap 10A may include a strengthening portion 106 positioned below at least one of the apertures 102 and having a thickness greater than the nominal thickness of the sidewall 96. With reference to FIGS. 12-14, the actuation member 74 may in a reinforcing structure 118 disposed on the main body 126 of the actuation member 74. The reinforcing structure 118 may be a generally longitudinally-extending rib 132 extending along at least a portion of the main body 126 of the actuation member 74. The rib 132 may increase the resistance of the actuation member 74 to bending and may be received within a depression 114 formed within a bottom surface 116 of the first channel 76 of the end cap 10A (see FIG. 8).

Figure 10:
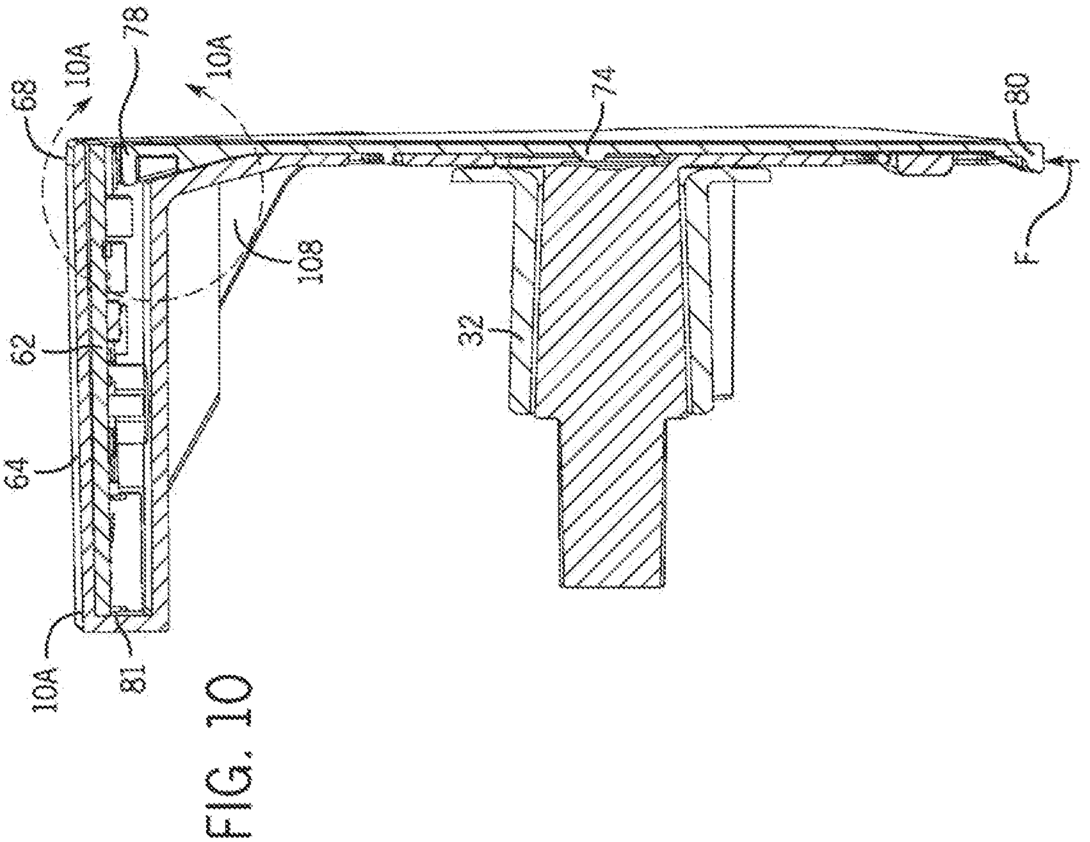
FIG. 10 is a lengthwise cross-sectional view of static mitigation end cap components taken along line 10-10 of FIG. 4 in accordance with some embodiments of the present disclosure. An actuation button is shown in a down position.
Figure 11A:
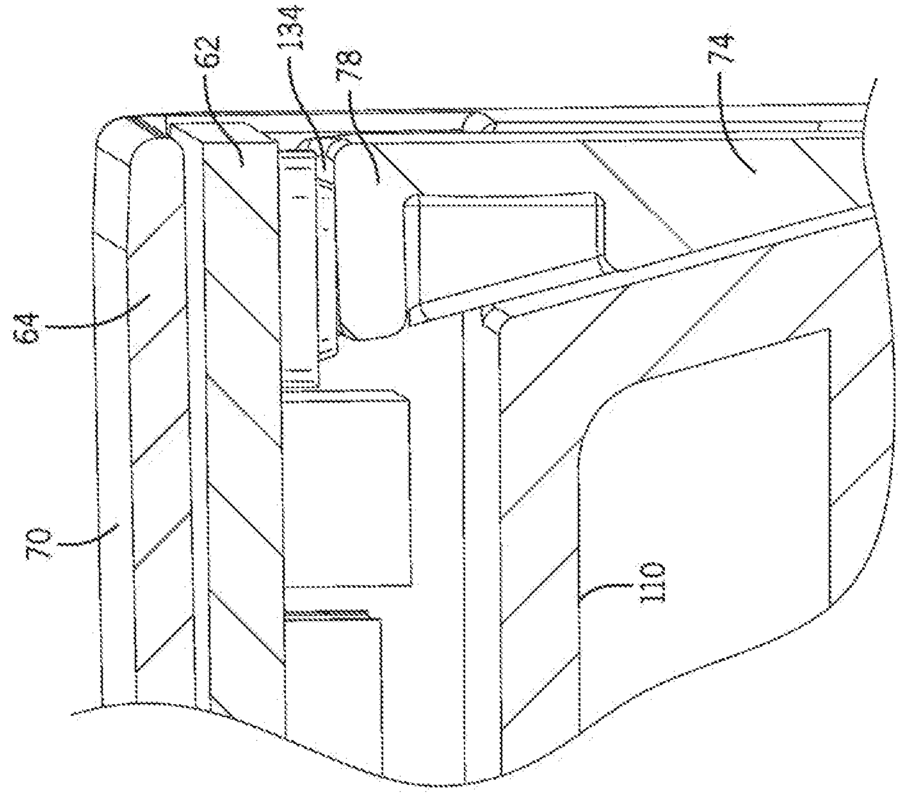
FIG. 11A is an enlarged, fragmentary view of a cross section of the static mitigation end cap components of FIG. 11 taken along detail line 11A-11A of FIG. 11 in accordance with some embodiments of the present disclosure.
Figure 11:
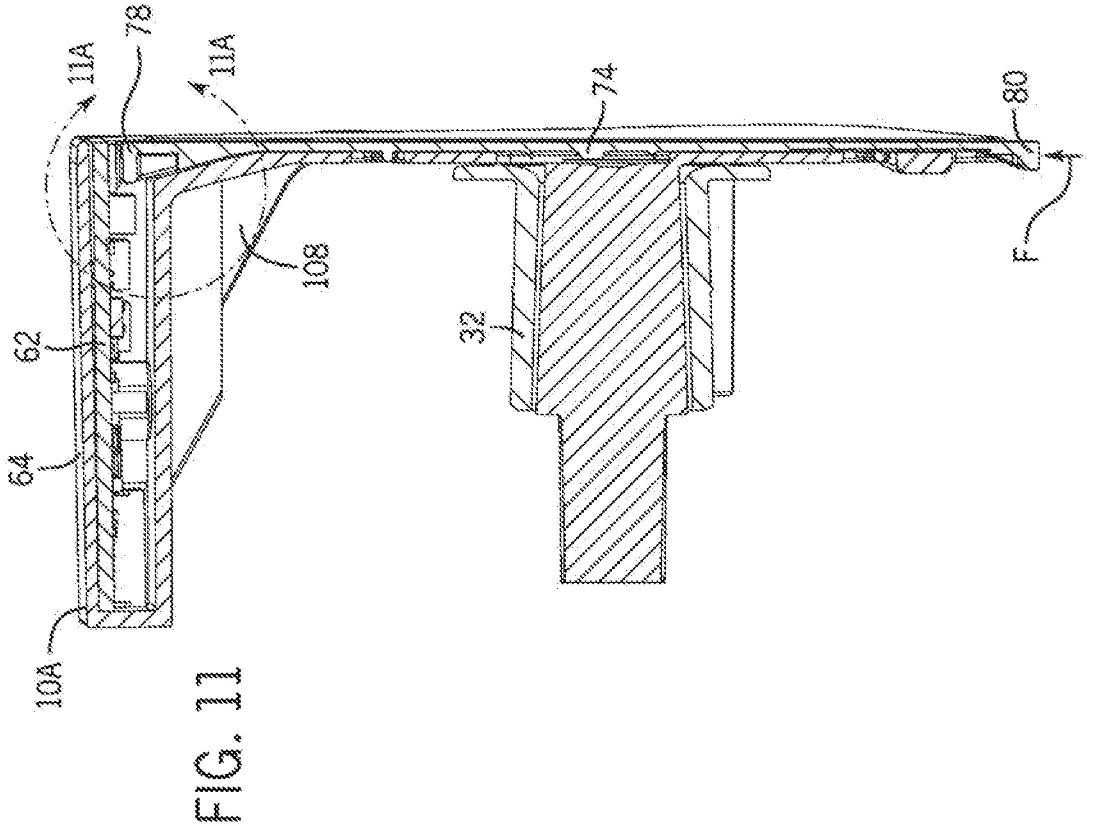
FIG. 11 is a lengthwise cross-sectional view of static mitigation end cap components taken along line 11-11 of FIG. 4 in accordance with some embodiments of the present disclosure. An actuation button is shown in an up position.

With reference to FIGS. 7, 9 and 10, the end cap 10A may include a gusset plate 1€03 positioned adjacent the housing 64 to strengthen the connection between the end cap 10A and the orthogonally-extending housing 64. In some embodiments, the gusset plate 108 may extend generally perpendicular to a longitudinal plane of the housing 64. The gusset plate 108 may be connected to both a bottom surface 110 of the housing 64 and the inner lace 98 of the sidewall 96 (see FIG. 7). In some embodiments, the gusset plate 108 extends generally parallel to a rear surface 112 of the end cap 10A (see FIG. 9). In some embodiments, the gusset plate 108 is formed as a. unitary structure with the rear surface 112 of the end cap 10A.

With reference to FIGS. 5 and 8, the first channel 76 may extend at an angle relative to the housing 64, For example, the first channel 76 may extend at approximately a 45¬90 degree angle (e.g., 60 degrees) relative to the housing 64. In some embodiments, the first channel 76 may overlap the aperture 84 of the end cap 10A. In such embodiments, the actuation member 74 may extend at least partially over the aperture 84. The first channel 76 may have a first opening positioned adjacent the housing 64 and a second opening positioned adjacent the bottom surface 82 of the end cap 10A, the first opening may permit the first end 78 of the actuation member 74 to at least partially extend into the chamber 72 to selectively engage the printed circuit board 62. The second end 80 of the actuation member 74 may extend through the second opening.

With reference to FIGS. 4 and 10-11A, when the actuation member 74 is pressed by a user, the actuation member 74 may translate longitudinally within the first channel 76 relative to the end cap 10A from a first position (see FIG. 10A), in which the actuation member 74 does not engage the printed circuit board 62, to a second position (see FIG. 11A), in which the actuation member 74 engages the printed circuit board 62 by, for example, compressing or activating the switch or button 79 or some other control element. In some embodiments, the actuation member 74 may be biased to automatically return to the first position. The actuation member 74 may be secured within the first channel 76 such that the actuation member 74 is not movable in a transverse direction relative to the longitudinal axis of the first channel 76. For example, the sliding engagement of the protrusions 124 and the tabs 101 may allow the actuation member 74 to translate longitudinally within the first channel 76 relative to the end cap 10A, but may prevent the actuation member 74 from translating away from, the end cap 10A out of the first channel 76. The sliding engagement of the protrusions 124 and the tabs 101 may maintain the actuation member 74 in the first position. For example, as seen in FIG. 6, a bottom surface of each of the apertures 102 may define an abutment wall 130. When the actuation member 74 is in the first position, the abutment wall 130 may contact the protrusions 124 and define a lowermost position of the actuation member 74. In some embodiments, the lowermost position is equivalent to the first position. During operation, the actuation member 74 may translate upward from the lowermost position to the second position.

With reference to FIGS. 12 and 13, the actuation member 74 may have a first surface 134 disposed on the first end 78 of the actuation member 74 and configured to selectively engage a portion of the printed circuit board 62, such as the switch or button 79. The first surface 134 may be substantially planar and oriented generally parallel to the printed circuit board 62 when the actuation member 74 is received within the first. channel 76, In some embodiments, the actuation member 74 may have a second surface 136 disposed on the second end 80 of the actuation member 74 and configured to receive a pressing force F from a user, The second surface 136 may be knurled to increase the friction between the second surface 136 and a user and may be substantially parallel to the first surface 134. In some embodiments, both the first end 78 and the second end 80 of the actuation member 74 may be thicker and wider than the main body 126. As shown in FIGS. 12-14, the first end 78 and the second end 80 may be wedge shaped in two dimensions. In some embodiments, top and bottom surfaces of the protrusions 124 may be oriented parallel to the first surface 134 and the second surface 136, respectively. In some embodiments, the first surface 134, the second surface 136, and the protrusions 124 may extend at an angle. relative to the main body 126. As shown in FIGS. 12 and 13, in some embodiments, the first surface 134 forms a ridge 137. In such embodiments, the ridge 137 may align or otherwise facilitate engagement of the first surface 134 with the switch or button 79. Additionally or alternatively, the ridge 137 may reduce or mitigate the likelihood of damage to the switch or button 79. For example, by contacting a portion of the printed circuit board 62, the ridge 127 may limit the displacement of the switch or button 79 towards the printed circuit board 62.

Figure 15:
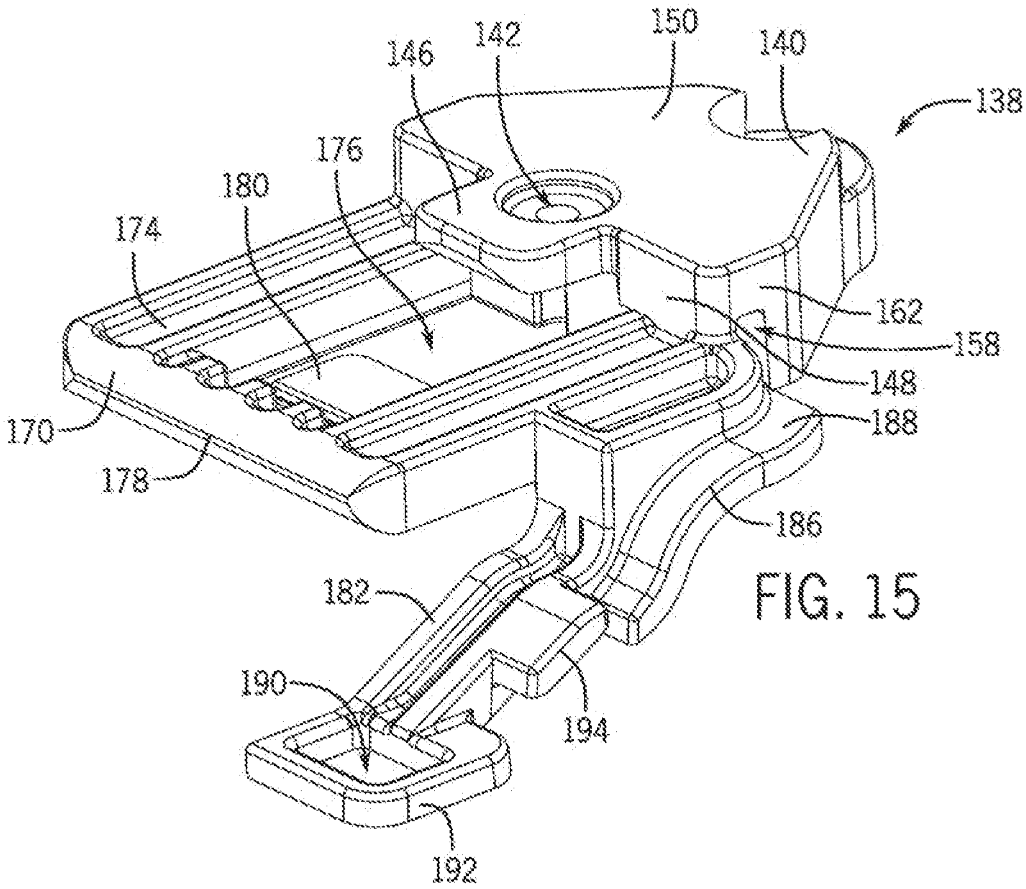
FIG. 15 is an isometric view of a cable restraint bracket in accordance with some embodiments of the present disclosure.
Figure 16:
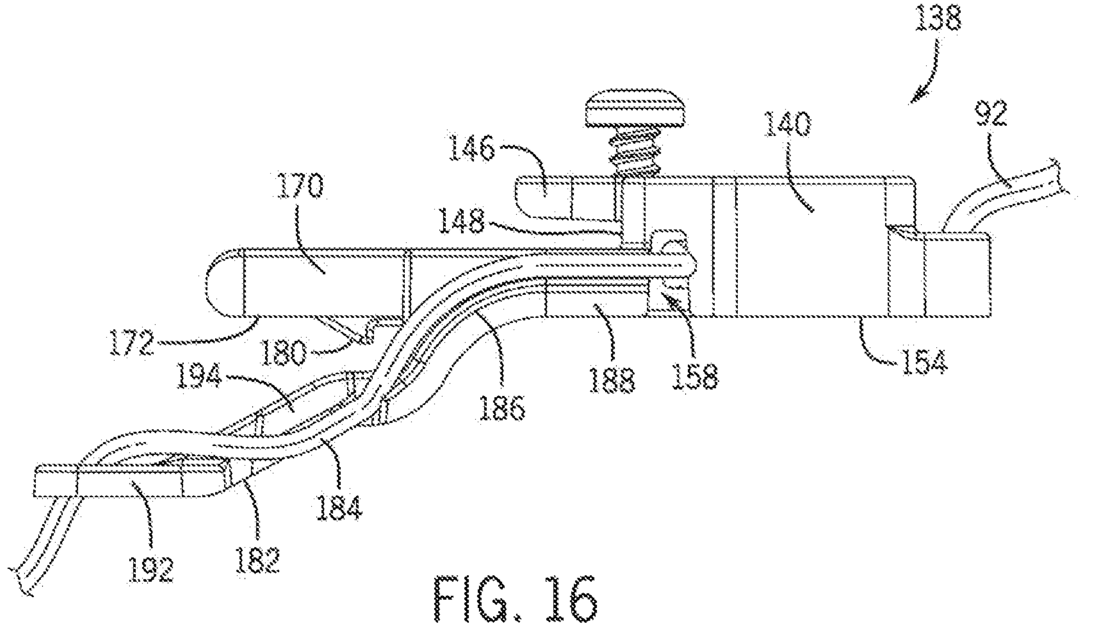
FIG. 16 is a side elevation view of the cable restraint bracket of FIG. 15 with a power cable assembly routed therethrough in accordance with some embodiments of the present disclosure.
Figure 17:
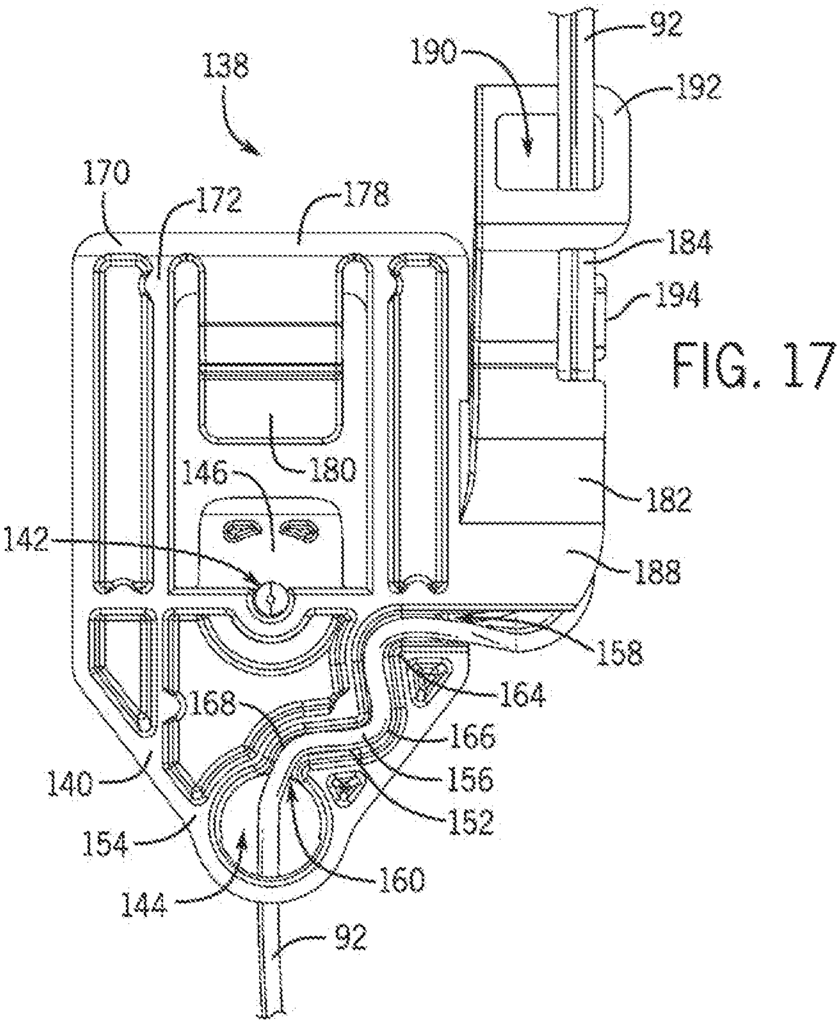
FIG. 17 is a bottom plan view of the cable restraint bracket of FIG. 15 with a power cable assembly routed therethrough in accordance with some embodiments of the present disclosure.

With reference to FIGS. 4, 16, and 17, the covering 2 may include a cable restraint bracket 13₹ 3 to position and secure the power cable assembly 92 providing power to the covering 2, such as the motor assembly 18. As shown in FIG. 17, the cable restraint bracket 138 may include a main body 140 having a first aperture 142 and a second aperture 144 defined therethrough. The first aperture 142 may be defined at one end of the main body 140€, and the second aperture 144 may be defined at an opposite end of the main body 140. The first aperture 142 may receive a fastener, such as a. screw, to secure the cable restraint bracket 138 to the covering 2 or the architectural opening, and the second aperture 144 may be sized to receive an end of the power cable assembly 92. Referring to FIG. 15, the main body 140 may include a tab 146 extending from an end wall 148 of the main body 140 adjacent the first aperture 142. In some embodiments, the tab 146 may extend from an upper portion of the end wall 148, Together, the tab 146 and the main body 140 may coextensively define an upper surface 150 of the cable restraint bracket 138.

With reference to FIG. 17, the main body 140 may include a passage 152 defined within a bottom surface 154 of the main body 140 and configured to receive and secure a first portion 156 of the power cable assembly 92. The passage 152 may have a first opening 158 defined in a side surface 162 (see FIG. 15) of the main body 140, and a second opening 160 in communication with€ the second aperture 144. As shown in FIG. 17, the passage 152 may be nonlinear to inhibit the power cable assembly 92 from translating longitudinally within the passage 152. For example, the passage 152 may include a first bend 164, a second bend 166, and a third bend 168 formed in a zigzag pattern to prevent the power cable assembly 92 from being pulled through the passage 152. In this manner, the cable restraint bracket 138 may isolate any external force acting on the power cable assembly 92 and prevent the power cable assembly 92 from being disconnected from the printed circuit board 62.

With reference to FIGS. 15 and 16, the cable restraint bracket 138 may include a projection 170 extending longitudinally from the end wall 148 of the main body 140 to provide structure to position the power cable assembly 92 within the head rail 2 and help prevent the power cable assembly 92 from interfering with operation of the covering 2, such as rotation of the roller tuba The projection 170 may extend from a lower portion of the end wall 148 such that the projection 170 extends substantially below the tab 146 and has a bottom surface 172 coextensively aligned with the bottom surface 154 of the main body 140. In some embodiments, the width of the projection 170 may be equivalent to the width of the main body 140. As illustrated in FIG. 15, a plurality of longitudinal channels 174 may be defined in an exterior surface of the projection 170 to reduce the weight of the cable restraint bracket 138 and increase the rigidity of the projection 170. The projection 170 may have an opening 176 defined therethrough substantially along a longitudinal center-line of the cable restraint. bracket 138. In some embodiments, the opening 176, the first aperture 142, and the second aperture 144 may all be formed substantially along the longitudinal center-line of the cable restraint bracket 138. Additionally, or alternatively, the opening 176 may be defined by a U-shaped projection 170 connected to the end wall 148 with a closed end 178 of the U-shaped projection 170 being positioned opposite the end wall 148. In some embodiments, a substantially planar flange 180 may project from the closed end 178 of the projection 170 in a longitudinal direction towards the end wall 148. The flange 180 may extend from the bottom surface 172 of the projection 170 and may aid in securing the cable restraint bracket 138 (e.g., to the headrail 4).

Referring now to FIGS. 15-17, the cable restraint bracket 138 may include an arm 182 configured to receive and secure a second portion 184 of the power cable assembly 92 (see FIG. 16). In some embodiments, the arm 182 may extend substantially below the bottom surfaces 154, 172 of both the main body 140 and the projection 170 and adjacent the projection 170 arid the first opening 158 of the passage 152. In an exemplary embodiment, the arm 182. is operable to guide the power cable assembly 92 to the opening 90 in the sidewall 96 of the end cap 10A (see FIG. 4). In this manner, the arm 182 positions the power cable assembly 92 a safe distance away from the internal moving parts within the headrail 4 (e.g., away from the roller tube, the right bushing 40, the coupler 48, etc.). The arm 182. may extend at an angle relative to the bottom surfaces 154, 172. For example, as best seen in FIG. 16, the arm 182 may extend at substantially a 30 degree angle relative to the bottom surfaces 154, 172. The arm 182 may include a sloping ramp 186 at a first end 188 of the arm 182 adjacent the first opening 158 and an orifice 190 at a second end 192 of the arm 182 opposite the first end 188. The orifice 190 may be a. closed-loop and may be sized to receive an end of the power cable assembly 92. The orifice 190 may be substantially parallel with the bottom surfaces 154, 172 of the main body 140 and the projection 170 to reduce the overall dimension of the cable restraint bracket 138. A securing tab 194 may be positioned substantially between the orifice 190 and the ramp 186 and extend laterally from the arm 182 away from the longitudinal center-Fine of the cable restraint. bracket 138. Together, the orifice 190, securing tab 194, and ramp 186 may secure the power cable assembly 92 to the arm 182. For example, the second portion 184 of the power cable assembly 92 may be at least partially muted through the orifice 190, substantially below the securing tab .194, and substantially above the ramp 186.

With reference to FIGS. 4, 16, and 17, the power cable assembly 92 may be routed through both the cable restraint bracket 138 and the end cap 10A to connect ultimately with the printed circuit board 62. In some embodiments, an end of the power cable assembly 92 having a connection portion may be routed first through the second aperture 144 of the main body 140 of the cable restraint bracket 138. The power cable assembly 92 may then be routed through the nonlinear passage 152, including through both the second opening 160 and the first opening 158. The power cable assembly 92 may then be routed downwardly along the ramp 188, substantially beneath the securing tab 194, and downwardly through the orifice 190. The power cable assembly 92 may then be routed through the opening 90 of the end cap 10A and through the second channel 9$. The power cable assembly 92 may then be connected to the printed circuit board 62 via the connection portion, The end of the power cable assembly 92 opposite the connection portion may be connected to a power source, such as a battery or an AC voltage source.

The end cap 10A, the actuation member 74, and the cable restraint bracket 138 may be constructed of substantially any type of material. For example, the end cap 10A, actuation member 74, and cable restraint bracket 138 may be constructed from natural and/or synthetic materials, including metals, ceramics, plastics, and/or other suitable materials that insulate against static electricity discharge therethrough. Plastic materials may include thermoplastic material (self-reinforced or fiber-reinforced), ABS, polycarbonate, polypropylene, polystyrene, PVC, polyamide, or PTFE, among others. The end cap 10A, actuation member 74, and cable restraint bracket 138 may be formed or molded in any suitable manner, such as by plug molding, blow molding, injection molding, or the like.

An illustrative example of the shade 8 is shown in FIG. 1. In an exemplary embodiment, the shade 8 may have a width substantially equivalent to the length of the roller tube, which may reduce or eliminate the existence of a light gap between the edges of the shade 8 and the sides of the architectural opening or an adjacent shade. As noted above, the shade 8 may be retractable onto and extendable from the roller tube. For example, during extension of the shade 8 across an architectural opening, the shade 8 may be unwrapped from the roller tube when the roller tube is rotated in a first rotational direction. To retract the shade 8, the roller tube may rotate in a second rotational direction opposite the first rotational direction to wrap the shade 8 about the roller tube. The bottom rail 6 may extend along a lower edge of the shade 8 and may function as a ballast to maintain the shade 8 in a taut condition at a desired position and during extension and retraction of the shade 8. In some embodiments, the roller tube may be operable to retract the shade 8 towards the head rail 4 in a stacked configuration. For example, as seen in FIGS. 18 and 19, the roller tube may retract a plurality of lift cords 12 extending through the shade 8 and attached to the bottom rail 6. Upon retraction of the lift cords 12, the shade 8 may stack or fold onto itself in a vertical manner (see FIG. 19).

The shade 8 may be constructed of substantially any type of material, such as natural and/or synthetic materials, including fabrics, polymers, and/or other suitable materials, and may generate static energy as it moves towards and away from, or into and out of, the head rail 4. Fabric materials may include woven, non-woven, knits, ₹ or other suitable fabric types. In some embodiments, the shade 8 may be made from a flexible material adapted to be rolled around the roller tube, such as a flexible fabric material. The shade 8 may have any suitable level of light transmissivity to provide a desired ambience or decor in an associated room, and may be transparent, translucent, and/or opaque. In some embodiments, portions of the shade 8 may be made from a sheet of material with zero light transmissivity, often referred to as a blackout material. The shade 8 may include a single layer of material or multiple layers of material connected together. The shade 8 may have a high level of drape (less stiff) or a low level of drape (more stiff), which may be selected for obtaining an appropriate shade shape. Although the shade 8 illustrated in FIG. 1 has a support sheet 20 to which is attached a plurality of horizontally-disposed, vertically-spaced loops of material 22 simulating a Roman shade, a shade 8 used with any or all features of the present disclosure may be made of substantially any type of material and may take substantially any form.

Figure 2:
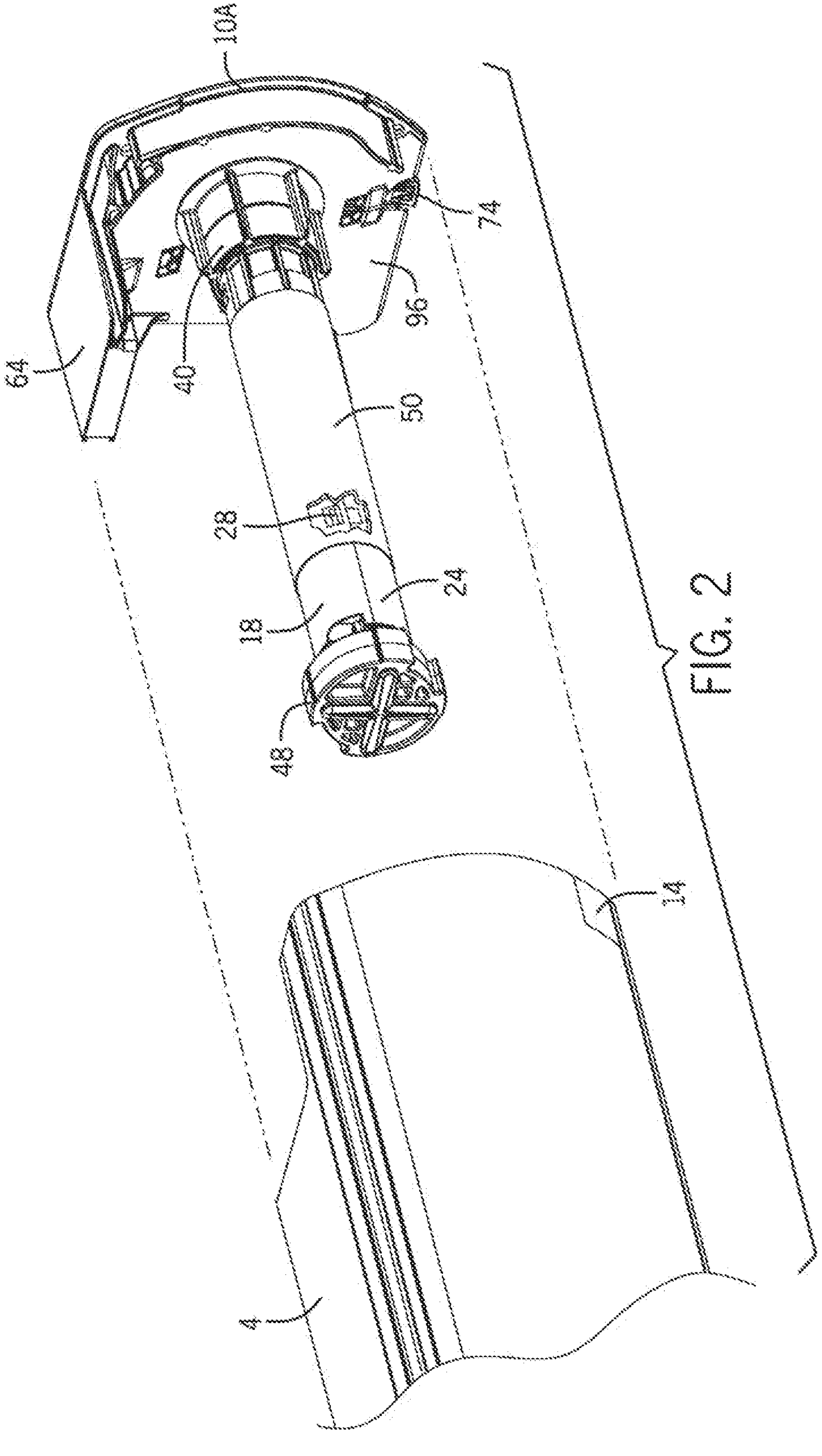
FIG. 2 is an exploded fragmentary isometric view showing a static mitigation end cap with a motor assembly mounted thereto in accordance with some embodiments of the present disclosure.

Referring to FIGS. 1-2, the covering 2 may include a manual or an automatic control system to control the extension and/or retraction of the shade 8 (see FIG. 1). For example, the control system may be wireless or wired, or a user may provide manual instruction input to the control system. Referring to FIG. 2, the motor assembly 18 is configured to extend or retract the shade 8 upon receiving an extension for retraction command or input. from the control system, for instance, the motor assembly 18 may be controlled by mechanical actuation of the actuation member 74, and/or may be controlled by an electronic actuation component, such as by a remote control unit 16 (see FIG. 1). To raise or retract the shade 8 from an extended position, a user may trigger the mechanical and/or electrical actuation component in a. first manner (e.g., pressing the actuation member 74 once). To extend or lower the shade 8 from a retracted position€, a user may manipulate the actuation component in a second manner (e.g., pressing the actuation member 74 twice or pressing the actuation member 74 for a certain period of time).

The motor assembly 18 may be hard-wired to the switch or button 79 and: or operably coupled to a sensor 14 that is operable to communicate with a transmitter, such as the remote control unit 16 shown in FIG. 1, to permit a user to control the motor assembly 18 and thus the extension and/or retraction of the shade 8. The motor assembly 18 may include a "gravity lower" state to permit the shade 8 to lower via gravity without motor intervention, thereby reducing power consumption. The motor assembly 18 may include a speed governing device to control or regulate the extension (e.g., lowering) or retraction (e.g., rising) speed of the shade 8. Pre-programmed commands may be used to control the motor assembly 18 and thus control the position of the shade 8. The commands may instruct the motor assembly 18 to move the shade 8 into predetermined shade positions, such as a first position in which the shade 8 is fully retracted, a second position in which the shade 8 is fully extended, and a third position in which the shade 8 is partially-extended to an intermediate position determined by a user. The commands may be transmitted to the motor assembly 18 by the remote control unit 16.

With reference to FIGS. 3 and 4, the motor assembly 18 may include a two-piece motor housing 24 that surrounds a motor. The two pieces or components 26 of the motor housing 24 may be identical to one another and may be mounted together to substantially encapsulate the motor. When assembled together, the two components 26 may form a substantially cylindrical motor housing 24 having an internal cylindrical cavity. Releasable catches 28 (see FIG. 2) may be provided in corresponding surfaces of the two components 26 to secure the two components 26 of the motor housing 24 together. In some embodiments, fasteners 30 may secure the two components 26 together.

The motor assembly 18 may be fixedly attached to an end cap 10, such as the right end cap 10A, the motor assembly 18 may be axially aligned with the roller tube and attached to the end cap 10A by a screw, adhesive, corresponding retention features, heat or sonic welding, or any other suitable attachment means. As shown in FIG. 3, the end cap 10A may have an inwardly-directed mounting boss 32 having a mounting ring 34 at its distal end. The mounting ring 34 may have a plurality of circumferentially-spaced, longitudinally-extending fins 36 and diametrically-opposed catch tabs 38. The catch tabs 38 may be beveled to receive the motor assembly 18 as described hereafter. A right bushing 40 may be rotatably seated on the mounting boss 32 between the end cap 10A and the mounting ring 34 to rotatably support the roller tube within the head rail 4 as more fully described hereafter. It should be understood the motor assembly 18 may be attached to either the right end cap 10A or a left end cap 10B.

The end of the motor housing 24 adjacent the end cap 10A may have diametrically-opposed, longitudinally extending resilient arms 42 having substantially rectangular holes 44 defined therethrough. The end of the motor housing 24 adjacent the end cap 10A may have a plurality of circumferentially-spaced, longitudinally-extending slots 46. The resilient arms 42 of the motor housing 24 may be slid over the catch tabs 38 of the end cap 10A until the catch tabs 38 project into the holes 44. Additionally, or alternatively, the plurality of fins 36 disposed on the mounting ring 34 may be received within the plurality of slots 46 formed within the motor housing 24. In some embodiments, the motor housing 24 is releasably secured to the mounting ring 34 and prevented from rotation by both receipt of the catch tabs 38 in the holes 44 of the resilient arms 42 and receipt of the fins 36 in the slots 46.

The motor assembly 18 may include a drive disk or coupler 48 operatively connected to a drive shaft projecting from the distal end of the motor housing 24 to drivingly engage the roller tube. The coupler 48 may be reversibly rotatable by a reversible motor mounted within the internal cavity of the motor housing 24. To shield or insulate the motor from static electricity, a sleeve made of a flexible heat-shrink plastic material 50 may be shrunk around the motor housing 24. to provide a static electricity barrier and prevent malfunctioning of the motor.

With continued reference to FIGS. 3 and 4, the right bushing 40 may be rotatably mounted onto a smooth portion 52 of the mounting boss 32. The right bushing 40 may include a sleeve 54, a plurality of longitudinally-extending, circumferentially-spaced ribs 56 projecting radially outwardly from the sleeve 54, and a flange 58 projecting radially outwardly from an end of the sleeve 54. The sleeve 54 may define a substantially cylindrical inner surface 60 that rotatably bears against the smooth portion 52 of the mounting boss 32. The ribs 56 may engage an inner surface of the roller tube so that the right bushing 40 rotatably supports the roller tube and rotates in unison with the roller tube about the smooth portion 52 of the mounting boss 32. The flange 58 may project radially outwardly of the ribs 56 and may abut against an end of the roller tube to axially locate the right bushing 40 relative to the roller tube. The sleeve 54 and ribs 56 of the right bushing 40 may be radially positioned between the mounting boss 32 and the roller tube.

In some embodiments, the mounting boss 32 and mounting ring 34 are rigidly mounted on the end cap 10A, with the right bushing 40 rotatably mounted on the mounting boss 32. The motor assembly 18 may be mounted on the mounting ring 34 and secured thereto via locking engagement of the resilient arms 42 with the catch tabs 38. As shown in FIG. 2, the motor assembly 18 may project axially along at. least a portion of the length of the head rail 4. in some embodiments, the motor assembly 18 is at least partially received within the roller tube. In such embodiments, the coupler 48 may be configured to drivingly engage an inside surface of the roller tube to effect reversible rotation of the roller tube via energy provided by the motor. The opposite or left end of the roller tube may be rotatably supported by the left end cap 1013 in a similar or conventional manner, which is not illustrated.

The foregoing description has broad application. While the provided examples describe the shade 8 wrapped about the roller tube, it should be appreciated that the concepts disclosed herein may equally apply to many types of shades, including Venetian blinds and stackable shades or coverings. While the provided examples depict the motor assembly 18 and the printed circuit board 62 associated with the right end cap 10A, it should be appreciated that the concepts disclosed herein may equally apply to the left end cap 10B. Accordingly, the discussion of any embodiment is meant only to be explanatory and is not intended to suggest that the scope of the disclosure, including the claims, is limited to these examples. In other words, while illustrative embodiments of the disclosure have been described in detail herein, it is to be understood that the inventive concepts may be otherwise variously embodied and employed, and that the appended claims are intended to be construed to include such variations, except as limited by the prior art.

The foregoing discussion has been presented for purposes of illustration and description and is riot intended to limit the disclosure to the form or forms disclosed herein. For example, various features of the disclosure are grouped together in one or more aspects, embodiments, or configurations for the purpose of streamlining the disclosure. However, it should be understood that various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure.

The phrases “at least one”, “one or more”, and “and/or”, as used herein, are open-ended expressions that are both conjunctive and disjunctive in operation.

The term “a” or “an” entity, as used herein, refers to one or more of that entity. As such, the terms “a” (or “an”), “one or more” and “at least one” can be used interchangeably herein.

All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader’s understanding of the present disclosure, and do not create limitations, particularly as to the position, orientation, or use of this disclosure. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are tor purposes of illustration only and the dimensions, positions, order and relative sizes reflected in the drawings attached hereto may vary.

What is claimed is:

1. An architectural covering assembly comprising:

an end cap that includes a housing and a side wall transverse to the housing;

a motor assembly;

a printed circuit board received within the housing of the end cap, wherein the printed circuit board is electrically coupled to the motor assembly, and wherein the electrical coupling includes wiring via an aperture of the end cap; and an actuation member slidably received within the side wall of the end cap to engage the printed circuit board such that the printed circuit board controls an operation of the motor assembly.

2. The architectural covering of claim 1, wherein:

the motor assembly includes a motor control component; and the printed circuit board is electrically coupled to the motor control component.

3. The architectural covering of claim 1, further comprising a head rail that is coupled to the end cap.

4. The architectural covering of claim 1, wherein:

the end cap defines a channel; and the actuation member is movable within the channel of the end cap to engage the printed circuit board.

5. The architectural covering of claim 1, wherein:

the end cap includes an end cap outer surface;

the actuation member includes an actuation member outer surface; and the end cap outer surface is flush with the actuation member outer surface.

6. The architectural covering of claim 1, wherein the actuation member is biased away from the printed circuit board.

7. The architectural covering of claim 6, wherein the actuation member is biased away from the printed circuit board by at least one of a weight of the actuation member or a switch operatively associated with the printed circuit board.

8. The architectural covering of claim 1, wherein the actuation member includes a first end and a second end, the actuation member is received within the end cap such that a user force on the second end causes the first end to engage the printed circuit board.

9. The architectural covering of claim 8, wherein the actuation member has a middle portion between the first end and the second end, the first end of the actuation member being wider than the middle portion.

10. The architectural covering of claim 9, wherein the middle portion includes a reinforcing structure extending along the middle portion of the actuation member.

11. The architectural covering of claim 8, wherein the second end includes a knurled end surface.

12. The architectural covering of claim 1, further comprising a switch operatively associated with the printed circuit board, wherein the actuation member is movably received within the end cap to engage the switch such that the printed circuit board actuates the motor assembly.

13. The architectural covering of claim 12, wherein the actuation member includes an end having an end surface and a pointed ridge extending from the end surface configured to engage with the switch.

14. The architectural covering of claim 1, wherein the actuation member includes a main body and protrusions extending laterally from the main body.

15. The architectural covering of claim 14, wherein:

the end cap includes tabs defining apertures in the end cap; and the protrusions of the actuation member are received in the apertures to allow movement of the actuation member relative to the end cap in a first direction but inhibit movement of the actuation member relative to the end cap in a second, opposite direction.

16. The architectural covering of claim 1, wherein the printed circuit board is frictionally engaged with the end cap.

17. The architectural covering of claim 1, wherein:

the end cap includes a wall defining a port and a chamber extending from the port; and the printed circuit board is received in the chamber and spaced from the port by a gap.

18. An architectural covering assembly comprising:

an end cap that includes a housing defining an enclosure, wherein the end cap defines an aperture and includes a side wall transverse to the housing;

a motor assembly;

a printed circuit board contained in the enclosure of the housing, wherein the printed circuit board is electrically coupled to the motor assembly, and wherein the electrical coupling includes wiring between the printed circuit board and the motor assembly via the aperture; and an actuation member slidably received within the side wall of the end cap to engage the printed circuit board such that the printed circuit board actuates the motor assembly.

19. A method of using an architectural covering, the method comprising:

accessing the architectural covering that includes:

an end cap includes a housing and a side wall transverse to the housing;

a motor assembly;

a printed circuit board received within the housing of the end cap, wherein the printed circuit board is electrically coupled to the motor assembly, and wherein the electrical coupling includes wiring between the printed circuit board and the motor assembly via the end cap; and an actuation member received within the side wall of the end cap; and sliding the actuation member to engage the printed circuit board such that the printed circuit board controls an operation of the motor assembly.

20. An architectural covering assembly comprising:

an end cap;

a motor assembly;

a printed circuit board received within the end cap, wherein the printed circuit board is electrically coupled to the motor assembly;

an actuation member movably received within the end cap; and a light source, wherein the actuation member is movably received within the end cap to engage the printed circuit board such that the printed circuit board causes control of the motor assembly and the light source.

* * * * *